United States Patent
Ogino et al.

(10) Patent No.: US 6,571,220 B1
(45) Date of Patent: May 27, 2003

(54) COPY GENERATION MANAGEMENT METHOD, INFORMATION SIGNAL REPRODUCING METHOD, INFORMATION SIGNAL REPRODUCING APPARATUS, AND INFORMATION SIGNAL RECORDING APPARATUS

(75) Inventors: Akira Ogino, Tokyo (JP); Ikuko Sakudo, Tokyo (JP); Takashi Yamanishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/328,021

(22) Filed: Jun. 8, 1999

(30) Foreign Application Priority Data

Jun. 9, 1998 (JP) .......................................... 10-160980

(51) Int. Cl.[7] .............................................. G06F 17/60
(52) U.S. Cl. ........................................ 705/51; 380/201
(58) Field of Search ...................... 705/51, 57; 386/68, 386/82, 94, 95; 380/203, 201

(56) References Cited

U.S. PATENT DOCUMENTS 6,026,007 A * 2/2000 Jigour et al. ................... 365/51
6,282,654 B1 * 8/2001 Ikeda et al. ................ 703/200
6,289,102 B1 * 9/2001 Ueda et al. ................ 380/201

FOREIGN PATENT DOCUMENTS

EP           1 005 040 A1 * 5/2000

OTHER PUBLICATIONS

Acken, John; How watermarking adds value to digital content; Jul. 1998; Communications of the ACM v41n7, pp 74–77; dialog copy pp. 1–4.*

* cited by examiner

Primary Examiner—Thomas A. Dixon
(74) Attorney, Agent, or Firm—Frommer Lawrence & Haug LLP; William S. Frommer

(57) ABSTRACT

A reproducing and/or recording system in which copy generation of an information signal is controlled through the use of copy control information that is added to the information signal. The copy control information takes on at least one of three possible states, a one-copy allowed state, a more-copy prohibited state and a copy absolutely prohibited state. The system determines an initial copy control state for the signal being reproduced and determines the state of copy control information to be added to the reproduced signal based on at least the initial copy control information. During recording it may be determined that no further copy control information is to be added to the signal.

22 Claims, 20 Drawing Sheets

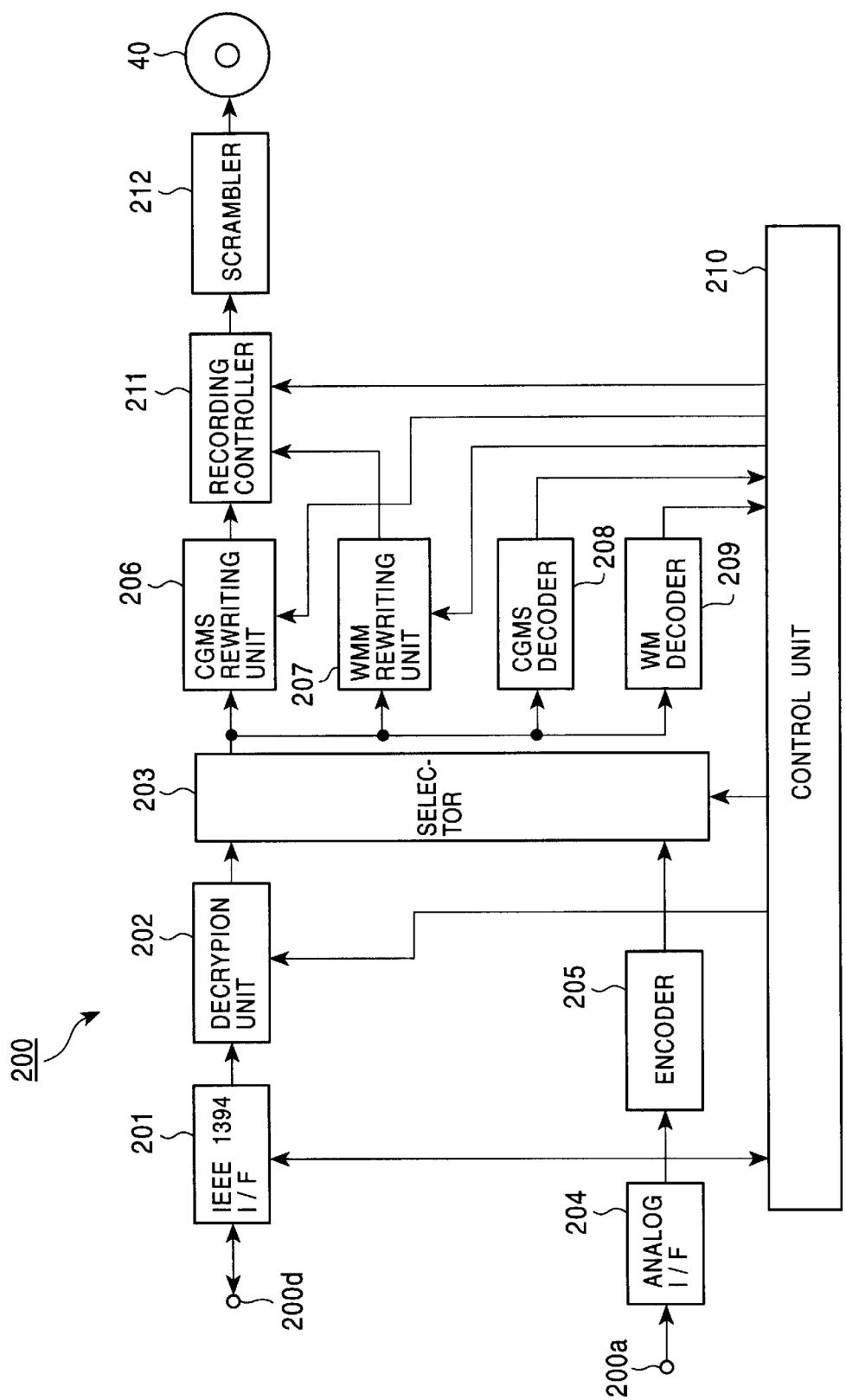

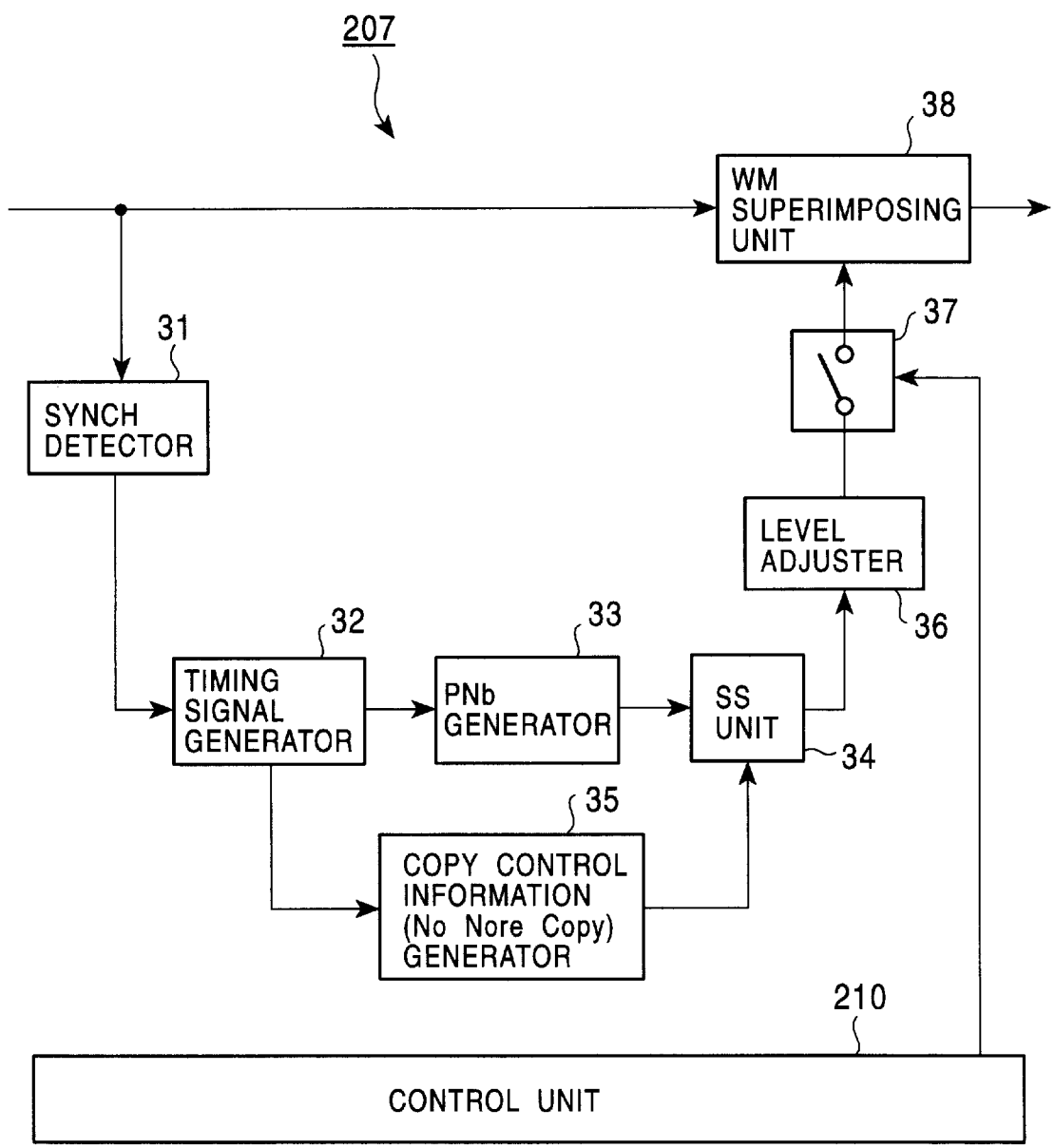

COPY GENERATION MANAGEMENT METHOD, INFORMATION SIGNAL REPRODUCING METHOD, INFORMATION SIGNAL REPRODUCING APPARATUS, AND INFORMATION SIGNAL RECORDING APPARATUS

BACKGROUND OF THE INVENTION

1. Field of the Invention

The present invention relates to recording information signals, such as digital image signals, on writable recording media, such as DVDs (Digital Video Discs), while information for copy control that is able to represent at least two states, i.e., a state allowing one copy and a state prohibiting copy subsequently or absolutely, is added to the information signals.

2. Description of the Related Art

Recently, with the expanding use of digital media, such as the Internet and digital video discs, illegal copying of digital works, such as digital pictures and digital books/articles has become a problem. To cope with the problem, it is proposed to add information for copy control to the digital works and prevent illegal copying based on the added information.

It is also proposed to provide the option of not allowing copying at all, or allowing copying once but prohibiting copying from the thus-produced copy (generation-limiting copy control system). The former control is applied to, e.g., original software that is prepared by contents makers and brought into the market in the form of DVD-ROMs or the like. The latter generation-limiting copy control system is applied to, e.g., broadcast information.

In the latter generation-limiting copy control system, there are proposed a CGMS (Copy Generation Management System) and a method utilizing electronic watermark processing.

The electronic watermark processing implies a process of "burying" information as noise in a portion of image data or music data which is not important from the viewpoint of human perception. Additive information buried in image data or music data by the electronic watermark processing is hard to remove. On the other hand, even after image data or music data has been subjected to a filtering process or a data compressing process, additive information buried therein can still be extracted.

In a typical copy control system utilizing the electronic watermark processing, the following four states are used to represent the copy generation and the copy limiting condition of image data or music data on which electronic watermark information is superimposed:

(1) "copy allowed free (Copy Free)",
(2) "one (only one generation) copy allowed (One Copy)",
(3) "more copy prohibited (No More Copy)", and
(4) "copy absolutely prohibited (Never Copy)".

The state of (1) "Copy Free" represents that image data or music data can be copied freely. The state of (2) "One Copy" represents that image data or music data is allowed to be copied once. The state of (3) "No More Copy" represents that image data or music data has been copied from the image data or the music data in the (2) "One Copy" state, and further copying thereof is prohibited. The state of (4) "Never Copy" represents that copying is absolutely prohibited.

If the electronic watermark information superimposed on image data or music data is in the "One Copy" state, a recording apparatus adapted for the electronic watermark processing (i.e., for the copy limitation processing) determines that copy recording of the image data or the music data is allowed, and executes the recording. At this time, electronic watermark information indicating "No More Copy" is superimposed on the image data or the music data being recorded. Thereafter, with the electronic watermark information superimposed on image data or music data in the "No more Copy" state, a recording apparatus adapted for the electronic watermark processing prohibits further recording of the data.

A copy control method utilizing the CGMS is described below. For an analog image signal, for example, two-bit additive information for copy control is superimposed thereon in one particular horizontal zone within a vertical blanking period. Also, for a digital image signal, two-bit additive information for copy control is added to digital image data and then transmitted together therewith.

The two-bit information (hereinafter referred to as CGMS information) used in the CGMS method can have the following meanings:

(00) . . . copy allowed free,
(10) . . . one (only one generation) copy allowed, and
(11) . . . never copy (copy absolutely prohibited).

The CGMS method does not include the above-mentioned "No More Copy" state.

If the CGMS information added to image information is (10), a recording apparatus adapted for the CGMS determines that copy recording of the image information is allowed, and executes the recording. At this time, the CGMS information rewritten to (11) is added to the thus-recorded image information. Thereafter, if recording of the image information having the added CGMS information of (11) is attempted, a recording apparatus adapted for the CGMS determines that copy recording of the image information is not allowed, and prohibits execution of the recording.

As described above, copy generation limiting control has been hitherto implemented by limiting recording of information for which copying is to be controlled, such as image data or music data, based on additive information for copy control. With such a conventional method, when a first copying is executed by recording apparatus adapted for the CGMS or electronic watermark processing, but a second copying is executed by recording apparatus not adapted for the CGMS or electronic watermark processing, the above-described recording limitation for the second generation copy is not implemented, and the second generation copy is generated in the same state as the first generation copy.

Such a situation will be described in more detail as to the case of copying digital image data with reference to FIG. 21.

In the example of FIG. 21, one channel of cable TV broadcasting is selected and received by a set top box 1, and digital TV broadcasting signals of a program of the selected channel are recorded on a disc recording medium 3 by a recording apparatus 2 adapted for the copy limitation processing. Then, the disc recording medium 3 is played back by a reproducing apparatus 4 adapted for the copy limitation processing, and reproduced output signals are recorded by a recording apparatus 5 not adapted for the copy limitation processing.

Assume that, in the example of FIG. 21, the program selected by the set top box 1 includes copy control information, and the information indicates that the recorded program is allowed to be copied once. In other words, the two-bit CGMS information (10) is superimposed on information of the broadcasting program when the CGMS method is used, and the electronic watermark information indicating the "One Copy" state is superimposed thereon when the electronic watermark processing is used. Note that an abbreviation WM in FIG. 21 represents electronic watermark information.

The recording apparatus 2 adapted for the copy limitation processing detects the CGMS information or the electronic watermark information WM superimposed on the information of the broadcasting program, and determines the detected information. If the detected information represents "One Copy", the information of the broadcasting program is recorded on the disc recording medium 3. At the same time, the CGMS information is rewritten to (11), and the electronic watermark information WM is rewritten to "No More Copy".

The disc recording medium 3 on which the information of the broadcasting program, including the rewritten information for copy control, has been recorded (copied) is played back by the reproducing apparatus 4 adapted for the copy limitation processing. The, reproduced output signals, particularly analog output signals, from the reproducing apparatus 4 may be supplied in some cases to the recording apparatus 5 which is not adapted for the copy limitation processing, i.e., the CGMS or electronic watermark processing.

However, because the recording apparatus 5 is not adapted for the copy limitation processing, the information of the broadcasting program, on which the CGMS information or the electronic watermark information WM in the state representing exactly the same copy generation as the first generation disc recording medium 3 is superimposed, is recorded on a new recording medium 6, as shown in FIG. 21.

The illegally copied recording medium 6 can be normally played back even with reproducing apparatus not adapted for the copy limitation processing, and the reproduced information of the broadcasting program can be normally looked at and listened to by viewers. Thus, the illegally copied recording medium 6 is treated as a legally copied disc, illustrating how illicit copying cannot be effectively prevented.

SUMMARY OF THE INVENTION

In view of the state of art set forth above, an object of the present invention is to provide a method and an apparatus which can essentially disable reproduction of information signals from an illegally copied recording medium, and can prevent illicit copying effectively.

To achieve the above object, a reproducing and/or recording system is provided, in which copy generation of an information signal is controlled through the use of copy control information that is added to the information signal. The copy control information takes on at least one of three possible states, a one-copy allowed state, a more-copy prohibited state and a copy absolutely prohibited state. The system determines an initial copy control state for the signal being reproduced and determines the state of copy control information to be added to the reproduced signal based on at least the initial copy control information. During recording it may be determined that no further copy control information is to be added to the signal.

BRIEF DESCRIPTION OF THE DRAWINGS

FIG. 6 is a block diagram of one example of a compliant recording apparatus used in the first embodiment of the present invention;

FIG. 7 is a block diagram of the electronic watermark information WM rewriting unit 207 shown in FIG. 6;

DESCRIPTION OF THE PREFERRED EMBODIMENTS

Embodiments of a copy generation management method according to the present invention, and a reproducing apparatus and a recording apparatus for implementing the method will be described below with reference to the drawings.

In the embodiments described below, it is assumed that information signals are supplied using a disc recording medium, information to be subjected to copy control is image information, and the disc recording medium is a DVD. Both CGMS information and electronic watermark information WM are employed as information for copy control. When both kinds of copy control information are applied to an information signal, the state closer to prohibition of copy is adopted as correct information for copy control. When plural pieces of electronic watermark information are detected, as described later, those pieces of information are processed in a like manner for selection of one.

Also, in the following embodiments, electronic watermark processing is carried out by applying spectrum spreading to the copy control information using PN (Pseudorandom Noise) series codes (hereinafter referred to as PN codes), and superimposing the copy control information thus subjected to spectrum spreading, as the electronic watermark information WM, on the image information.

Further, in the following description, a rewritable DVD will be referred to as a RAM disc, and a rewriting-disabled, read only DVD will be referred to as a ROM disc. Recording apparatus and reproducing apparatus adapted for the copy generation limitation processing will be referred to as compliant apparatus, and those apparatus not adapted for the copy generation limitation processing will be referred to as noncompliant apparatus.

As with the example shown in FIG. 21, the following embodiments will be described with respect to the case where digital broadcasting is received by a set top box (receiver). In an illustrative scenario received signals are recorded on a RAM disc by a recording apparatus separate from the receiver, and the RAM disc is played back by a reproducing apparatus.

First Embodiment

Outline of First Embodiment

Figure 1:
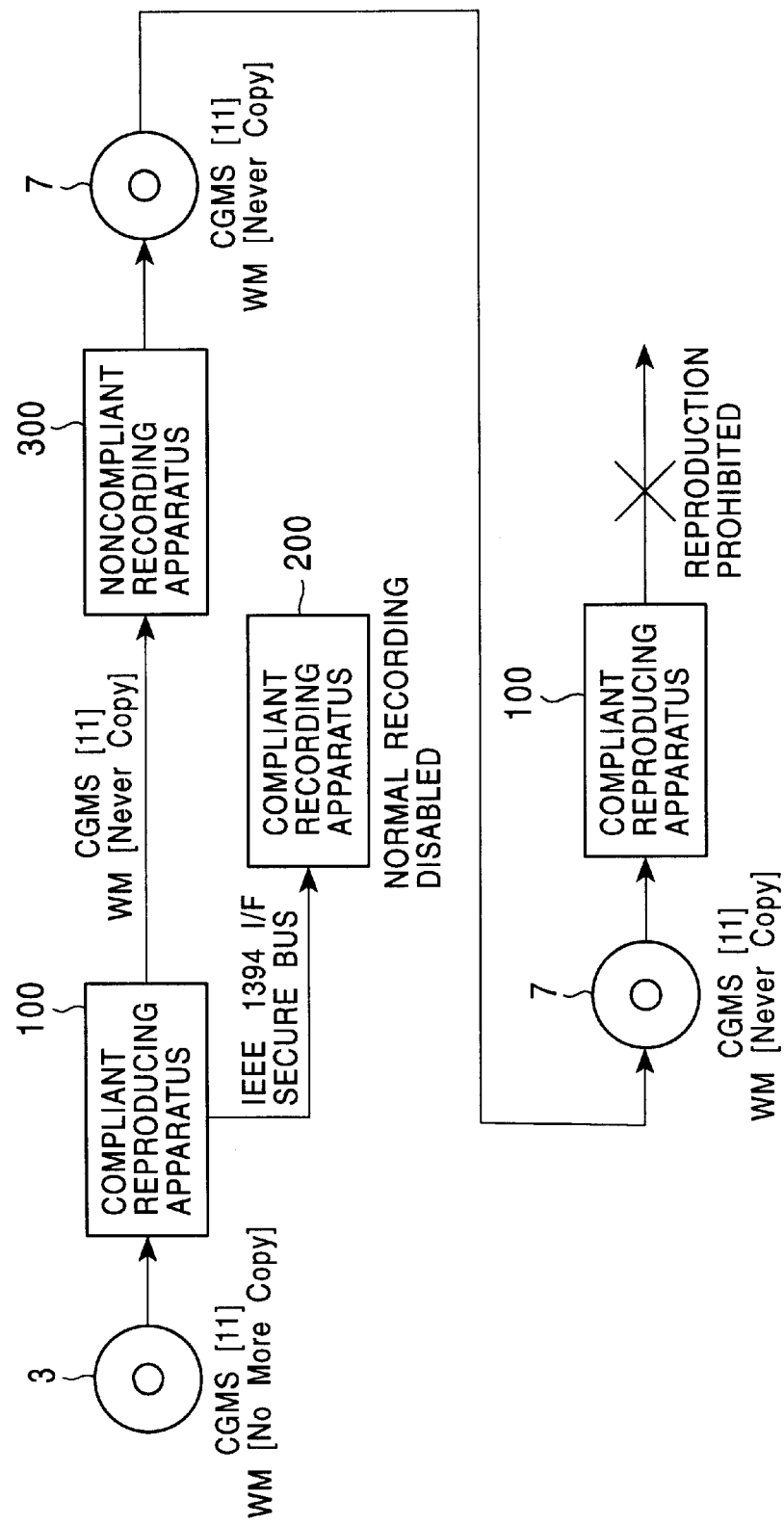
FIG. 1 is a diagram for explaining a first embodiment of a copy generation management method according to the present invention.

FIG. 1 is a diagram for explaining a principal part of a first embodiment of a copy generation management method according to the present invention. In the first embodiment, as with the case of FIG. 21, it is assumed that received signals from a receiver are in the "one copy allowed (One Copy)" state, and that when the received signals from the receiver are recorded by a compliant recording apparatus, the CGMS information is rewritten from (10) to (11) and the electronic watermark information WM is rewritten from the "One Copy" state to the "more copy prohibited (No More Copy)" state. In other words, the first embodiment performs the management of generation limiting information in substantially the same manner as a conventional system.

This first embodiment however differs from the conventional method in that the embodiment uses spectrum spreading for the electronic watermark processing. Specifically, without erasing the electronic watermark information representing the "One Copy" state, the electronic watermark information representing the "No More Copy" state is superimposed besides the former information by using a different PN code string from that used in the spectrum spreading for the prior watermark.

Even with such double superimposing, the copy control information having been subjected to the spectrum spreading can be superimposed on main information signals at an inconspicuous level. In addition, using different types of PN code strings makes it possible to distinguish multiple layers of superimposed copy control information. Accordingly, by applying the rule that the copy control information in the state closer to prohibition of copy is the current copy control information, an operating effect equivalent to that obtained by rewriting copy control information can be realized. In the following description, when plural states of watermark copy control information are detected, the state closer to prohibition of copy is assumed to be the current state.

Further, in this first embodiment, processing in the compliant reproducing apparatus is different from the conventional method in the following manner.

When playing back a disc for which it has been determined that the CGMS information is in the (11) state, or for which it has been determined that the electronic watermark information is in the "One Copy" state or the "No More Copy" state, information representing the "copy absolutely prohibited (Never Copy)" state is superimposed, as the electronic watermark information, on output signals reproduced from the disc.

Figure 21:
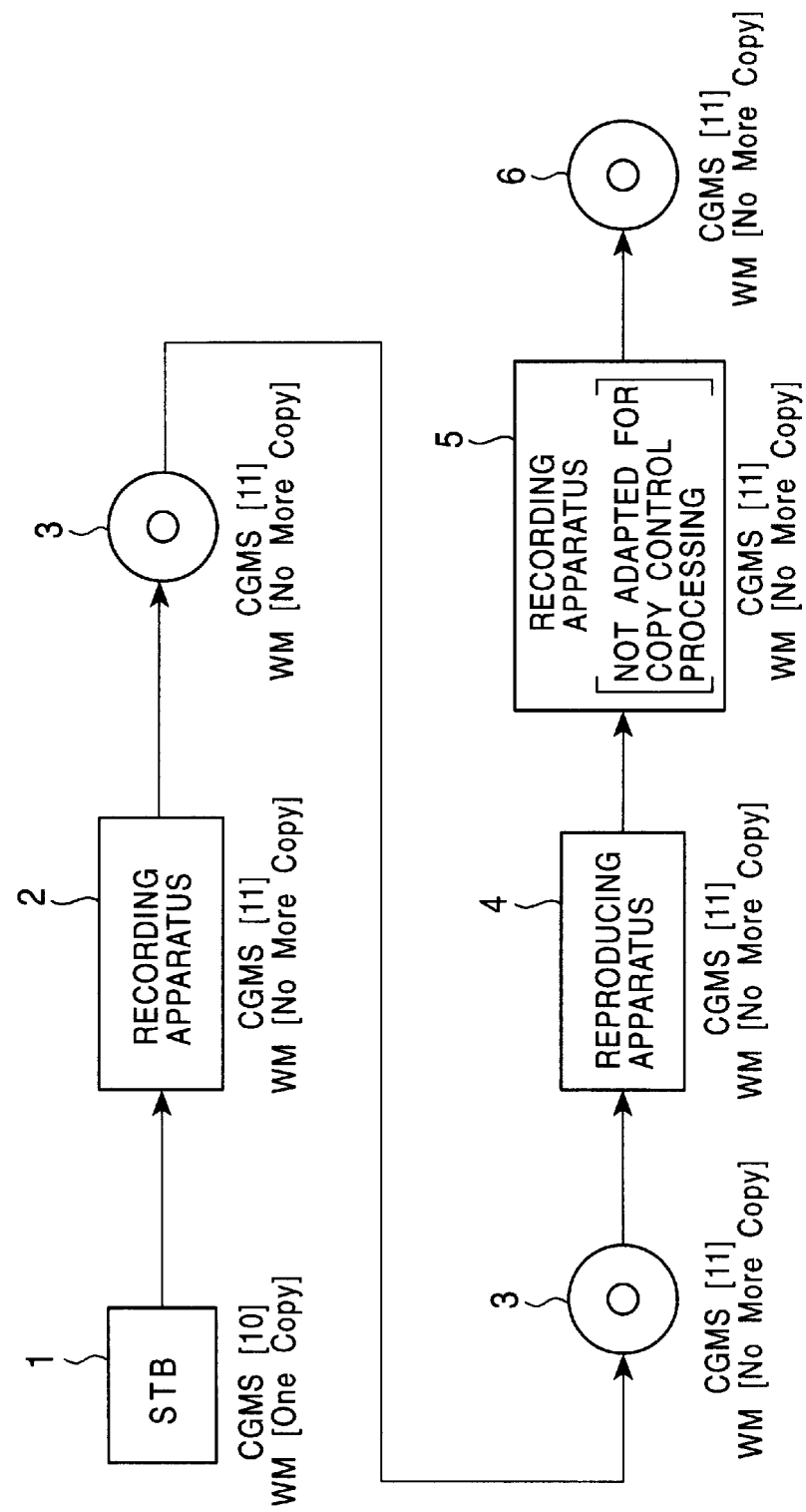
FIG. 21 is a diagram for explaining a conventional copy generation management method.

Thus, when a DVD-RAM disc 3 copied in a like manner to the case of FIG. 21 is played back by a compliant reproducing apparatus 100, the reproducing apparatus 100 determines that the disc 3 is a RAM disc and the electronic watermark information WM is in the "No More Copy" state and electronic watermark information WM of "Never Copy" is superimposed on the reproduced output signals.

Both the watermark information on the disc 3 and the watermark information superimposed on the reproduced output are subjected to spectrum spreading. Further, copy control information representing the "Never Copy" state is superimposed by using a different PN code string from that used in the spectrum spreading for any previous processing. Since this embodiment employs a spectrum spreading superimposition system, the term "rewriting of the electronic watermark information" in the following description implies further superimposition of information having been subjected to the spectrum spreading.

For a normal RAM disc, since it is a rewritable disc, the electronic watermark information WM superimposed on the information signals, which are recorded on the RAM disc 3 in this first embodiment, should always be in the "No More Copy" state.

Taking into account the above, as shown in FIG. 1, the compliant reproducing apparatus 100 in this first embodiment identifies whether the loaded disc is a ROM or RAM disc, and if it is a RAM disc, the apparatus 100 determines whether the electronic watermark information WM superimposed on the information signals recorded thereon is in the "Never Copy" state. If the electronic watermark information WM is determined to be in the "Never Copy" state, the disc (e.g. RAM disc 7) is regarded as an illegally copied disc and is prohibited from being played back. In other words, the information signals recorded on the illegally copied disc 7 can no longer be reproduced. As a result, illegal copying can be effectively prevented.

Further, in this first embodiment, an output of digital information can be transmitted between compliant apparatus in a MPEG-compressed fashion through interfaces in accordance with the IEEE 1394 standards. In this case, to prevent illegal copying, the transmitted digital information is encrypted in the interfaces in accordance with the IEEE 1394 standards. An interface verifies whether the destination of the output is a compliant apparatus or a recording apparatus, and also verifies the information for copy control, i.e., the CGMS information and the electronic watermark information. Depending on results of the verification, the interface then determines whether a key for decrypting the encrypted information is sent to the destination.

The above communication control system is called an IEEE 1394 secure bus and is used to effectively prevent illicit copying.

Next, one example of construction of the set top box (receiver), the recording apparatus, and the reproducing apparatus of the first embodiment will be described. In the embodiment described below, it is assumed that the electronic watermark copy control information having been subjected to spectrum spreading by using a first PN code string, i.e., a code string PNa, is superimposed on broadcasting signals. Generation limiting information is rewritten by the compliant recording apparatus based on the electronic watermark (WM) copy control information having been subjected to spectrum spreading by using a second PN code string, i.e., a code string PNb (different from PNa), and generation limiting information is rewritten by the compliant reproducing apparatus to "Never Copy" by using a third PN code string, i.e., a code string PNc (different from PNa and PNb).

For simplicity of description, the states of the electronic watermark information are expressed as follows. The "one copy allowed" state is expressed by "One Copy", the "more copy prohibited" state is expressed by "No More Copy", and the "copy absolutely prohibited" state is expressed by "Never Copy".

Relating to Set Top Box

Figure 2:
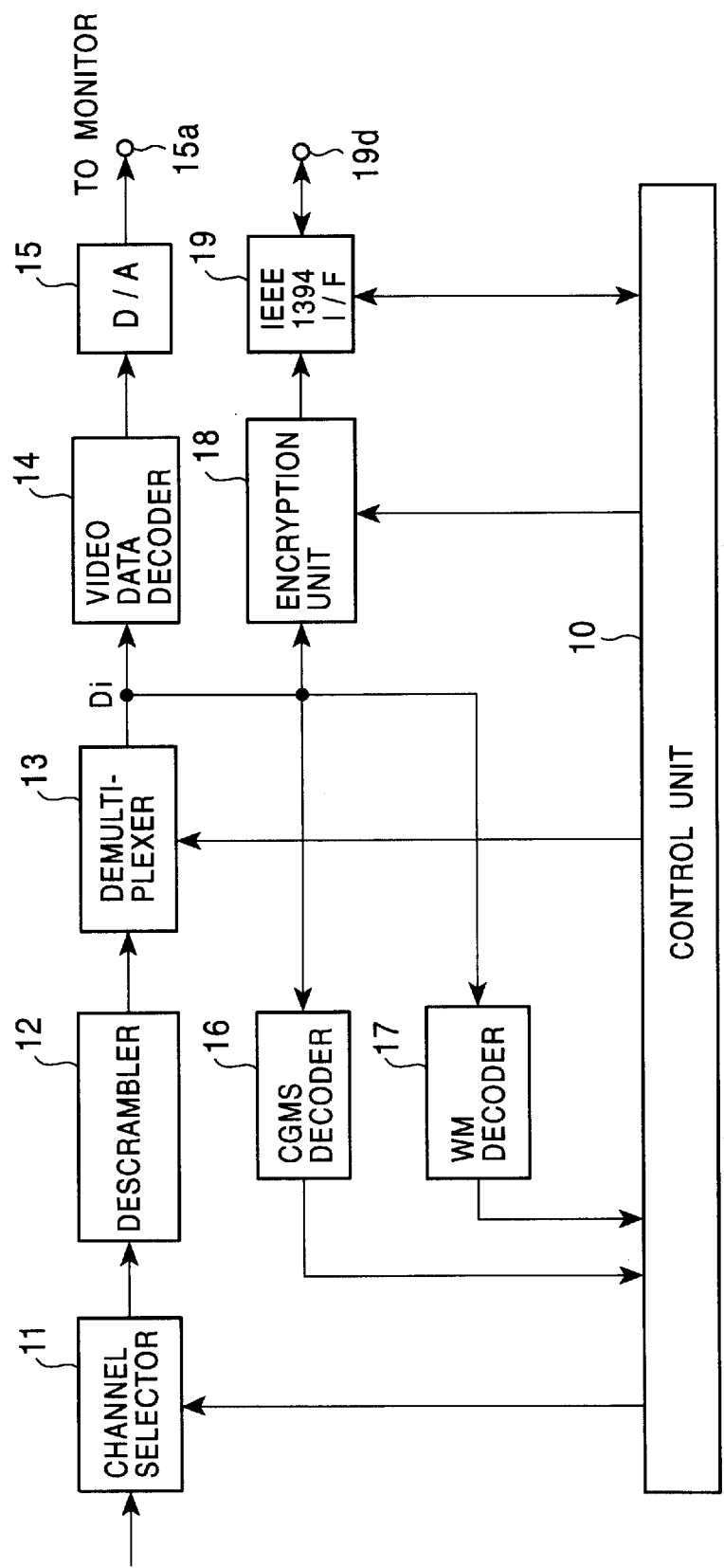
FIG. 2 is a block diagram showing one example of a set top box configuration suitable for use in the present invention.

FIG. 2 is a block diagram for showing one example of construction of the set top box used in this first embodiment.

As shown in FIG. 2, when a channel selection control signal in response to a channel selecting operation made by the user is supplied to a channel selector 11 from a control unit 10, signals of the selected channel are supplied from the channel selector 11 to a descrambler 12 in which a descrambling process is performed on scrambled broadcasting signals. The descrambled channel signals are supplied to a demultiplexer 13. Since a plurality of broadcasting programs are included in the output signals from the channel selector 11, the demultiplexer 13 extracts data of the broadcasting program which corresponds to an operation made by the user for selecting the broadcasting program.

Video data Di of the broadcasting program from the demultiplexer 13 is in an MPEG-compressed condition. For this reason, before being supplied to, e.g., a display monitor device, the data Di from the demultiplexer 13 is supplied to a video data decoder 14 in which the data Di is MPEG-decoded. The MPEG-decoded data is converted into analog signals by a D/A converter 15, and then supplied to the display monitor device, for example, via an analog output terminal 15a.

In this embodiment, the video data Di in the MPEG-compressed condition from the demultiplexer 13 is provided as a digital output via an IEEE 1394 interface. At this time, as described above, a process for preventing illegal copying is carried out by the IEEE 1394 secure bus.

More specifically, the output data Di from the demultiplexer 13 is supplied to a CGMS decoder 16 and an electronic watermark information decoder (hereinafter referred to as a WM decoder) 17 in which CGMS information and electronic watermark information WM added to the broadcasting program data are extracted, respectively.

The CGMS information is extracted as two-bit information in a particular position that is separate from the video data, the two-bit information being supplied to the control unit 10.

In this embodiment, the electronic watermark information WM is superimposed as a spectrum spread signal on the information signals. More specifically, as mentioned above, spectrum spreading is performed in this embodiment by generating PN codes, which are used as spreading codes, at a sufficiently fast cycle, and multiplying the copy control information by the PN codes, so that the copy control information having a narrow band and a high level is converted into a signal having a wide band and a very low level. The copy control information having been subjected to the spectrum spreading is then superimposed on the video data.

Figure 3:
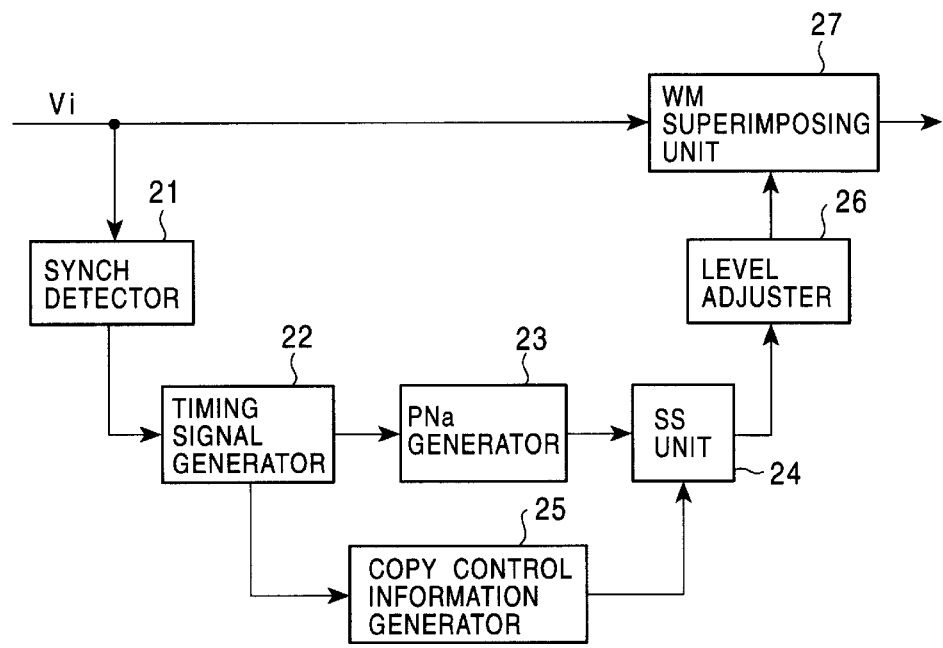
FIG. 3 is a block diagram for explaining a method of superimposing electronic watermark information in accordance with the present invention.

FIG. 3 is a block diagram for explaining a process of superimposing the electronic watermark information WM on the information signals in this embodiment. More specifically, in FIG. 3, a vertical synch signal for video signals Vi, for example, is detected by a synch detector 21, and the detector output is supplied to a timing signal generator 22. The timing signal generator 22 generates a timing signal in synch with the vertical synch signal.

In synch with the timing signal from the timing signal generator 22, a PNa generator 23 generates a PN code string PNa which is repeated at a vertical cycle, and supplies the PN code string PNa to an SS unit 23 (SS is an acronym of spectrum spreading; the acronym will be used throughout this description).

Also, in synch with the timing signal from the timing signal generator 22, a copy control information generator 25 generates copy control information to be superimposed as the electronic watermark information on the video signals Vi, and supplies the copy control information to the SS unit 24. At this time, it is determined which state (e.g. "Copy Free", "One Copy" and "Never Copy") the copy control information to be superimposed represents.

The SS unit 24 multiplies the copy control information by the PN code string PNa to produce spread spectrum signal. Then, the spread spectrum signal is supplied to an electronic watermark information superimposing unit 27 through a level adjuster 26, and is superimposed as the electronic watermark information on the input video signals Vi. The level adjuster 26 adjusts a level of the signal to be superimposed such that a picture reproduced from the signals Vi will not be significantly affected by the superimposition of the electronic watermark information. In this embodiment, the SS electronic watermark information is superimposed at a lower level than the dynamic range of the video signals.

Figure 5A:
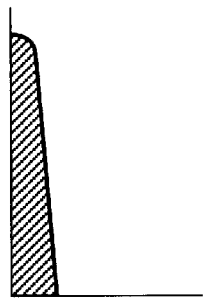
FIGS. 5A to 5D are graphs for explaining the implementation of electronic watermarking in accordance with the present invention.
Figure 5B:
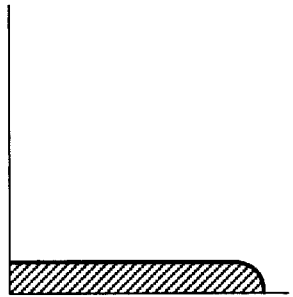

FIGS. 5A to 5D depict, in the form of a spectrum, the relationship between the copy control information, that is superimposed as the electronic watermark information, and the video signals. The copy control information contains a small amount of information, and is produced as a signal having a low bit rate and a narrow band as shown in FIG. 5A. When such a signal is subjected to spectrum spreading, a wide-band signal shown in FIG. 5B is obtained. The level of the spread spectrum signal is inversely proportional to the spreading ratio (i.e. the ratio of the bandwidth of the spread signal to the bandwidth of the signal before spreading).

Figure 5C:
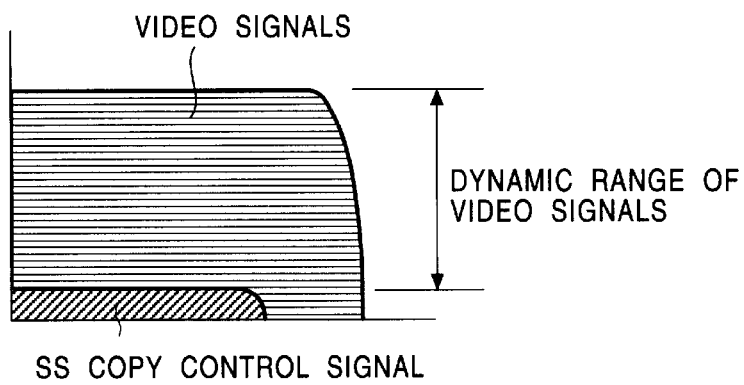

When the SS copy control information, is superimposed on the video signals Vi in the WM superimposing unit 27, as shown in FIG. 5C, the SS copy control information is superimposed at a lower level than the dynamic range of the information signals, i.e., the video signals. By superimposing the SS copy control information in such a manner, deterioration of the main information signals can be substantially avoided. Accordingly, when the video signals including the SS copy control information superimposed thereon are supplied to the monitor receiver and a picture is reproduced as described above, the influence of the SS copy control information insignificant and a good reproduced picture is obtained.

Figure 5D:
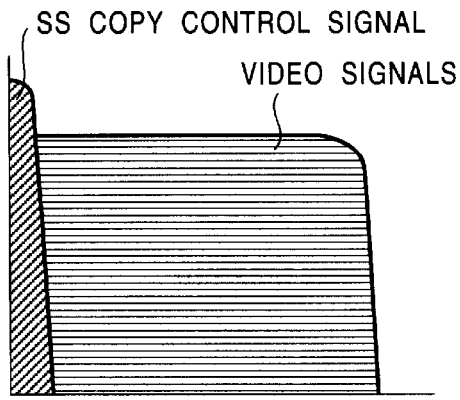

On the other hand, when the spread spectrum signal is subjected to spectrum de-spreading to detect the SS copy control information, as described later, the SS copy control information is restored to a narrow-band signal, as shown in FIG. 5D. By selecting a sufficient spreading ratio, the power of the copy control information after the de-spreading exceeds that of the information signals so that the copy control information can be detected.

Since the electronic watermark information is superimposed on the video signals and coexists at the same time period and same frequency range as the video signals, it is impossible to delete or modify the superimposed electronic watermark information by a frequency filter or simple replacement of information. Accordingly, the SS copy control information superimposed on the video signals cannot be removed or tampered with and copy control can be achieved with certainty.

In the configuration described above, since spectrum spreading is performed using the vertically synchronous PN code string with the vertical synch signal as a reference signal, the PN code string used in the spectrum de-spreading to be performed at the time of detecting the spectrum spread signal from the video signals can be easily produced based on a signal in synch with the vertical synch signal which is detected from the video signals.

Figure 4:
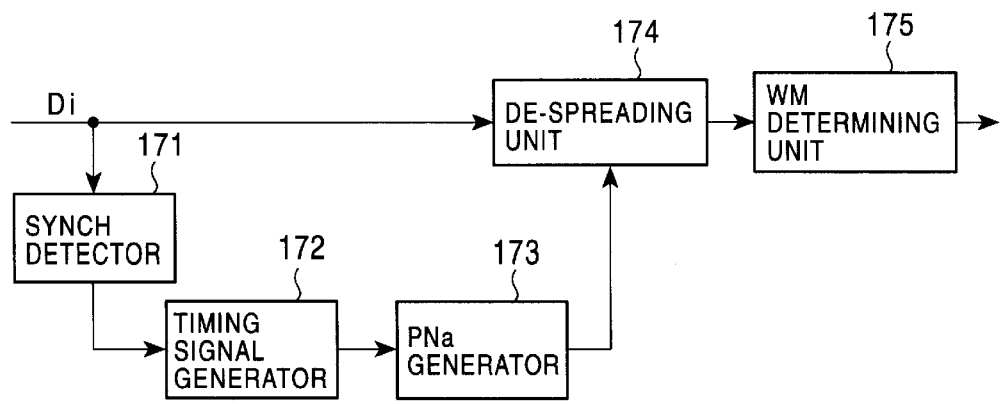
FIG. 4 is a block diagram for explaining a method of detecting electronic watermark information in accordance with the present invention.

Referring back to FIG. 2, the WM decoder 17 for extracting and determining the SS copy control information, that is superimposed as the electronic watermark information WM as described above, can be constructed as shown in FIG. 4. Referring to FIG. 4, the video data Di from the demultiplexer 13 is supplied to a de-spreading unit 174, and at the same time also supplied to a synch detector 171. The synch detector 171 detects the vertical synch timing, and supplies an indicator of the vertical synch to a timing signal generator 172.

The timing signal generator 172 supplies a vertical synch timing signal to a PNa generator 173. The PNa generator 173 generates the same PN code string as that generated by the PNa generator 23 during superimposing of the watermark information (see FIG. 3). The PNa generator 173 generates the PN code string PNa at the vertical synch timing the code string is supplied to a de-spreading unit 174 in which the SS copy control information is restored. The restored SS copy control information is supplied to a WM determining unit 175 for determining a copy control state of the video signals. The output of the determining unit is supplied to the control unit 10.

Returning to FIG. 2, the output data from the demultiplexer 13 is supplied to an encryption unit 18 in which the compressed video data is encrypted in accordance with cryptographic keys different for each process of communication under control by the control unit 10. The encrypted data from the encryption unit 18 is supplied to an electronic apparatus at a destination via an IEEE 1394 interface 19 and an output terminal 19b. The IEEE 1394 interface 19 outputs the data after converting it to be fit for the IEEE 1394 standards.

The control unit 10 communicates with the electronic apparatus at the destination via the IEEE 1394 interface 19 to determine whether the destination apparatus is a compliant apparatus, and if so, to determine whether it is a recording apparatus.

Based on the outputs resulted from determining the copy control information in the CGMS decoder 16 and the WM decoder 17, and the information resulted from determining the destination apparatus via the IEEE interface 19, the control unit 10 determines whether cryptographic key information for decryption matched with the encryption made in the encryption unit 18 is sent to the destination apparatus.

For example, if the destination apparatus is a noncompliant apparatus, the cryptographic key information is not sent to the destination apparatus. Also, if the destination apparatus is a compliant apparatus, but it is a recording apparatus, the cryptographic key information is not sent to the destination apparatus when the CGMS information is (11), or when the electronic watermark information WM is "No More Copy" or "Never Copy".

Relating to Compliant Recording Apparatus

Next, a compliant recording apparatus 200 will be described. FIG. 6 is a block diagram showing one possible configuration of compliant recording apparatus 200.

As shown in FIG. 6, the compliant recording apparatus 200 has a digital input terminal 200d for an IEEE 1394 interface, and an analog input terminal 200a. The digital input terminal 200d is connected to an IEEE 1394 interface 201. The IEEE 1394 interface 201 carries out a process of restoring the data, that has been converted to comply with the IEEE 1394 bus interface standards, into the original form.

The data from the IEEE 1394 interface 201 is supplied to a decryption unit 202. As described above, when copying of the input signals is allowed, the cryptographic key information for decryption is sent from the transmitting apparatus to the recording apparatus. If the cryptographic key information is sent, the decryption unit 202 performs decryption of the data supplied via the IEEE 1394 interface 201 so that the compressed video data is restored. The compressed video data thus restored is supplied to a selector 203.

The video information inputted via the analog input terminal 200a is supplied to a compression encoder 205 via an analog interface 204, and then to the selector 203 after being MPEG-compressed.

In response to a selector control signal applied upon an input selection made by the user, the selector 203 selects and outputs one of the data from the decryption unit 202 or compression encoder 205.

The output data of the selector 203 is supplied to a recording controller 211 through a CGMS rewriting unit 206 and an electronic watermark information WM rewriting unit 207. The output data of the selector 203 is also supplied to a CGMS decoder 208 and a WM decoder 209 which extract and determine the CGMS information and the electronic watermark information, respectively, in a similar manner as described above. The outputs of CGMS decoder 208 and WM decoder 209 are indicative of the CGMS information and the electronic watermark information of the received signals.

The outputs of the decoders are supplied to a control unit 210 and based on the outputs, the control unit 210 determines whether recording (copying) of the input information is allowed, and if so, also determines whether the CGMS information and the electronic watermark information for copy control should be rewritten.

Then, if the control unit 210 determines that recording is prohibited, it instructs the recording controller 211 to disable recording.

Also, if the control unit 210 determines that recording is allowed, or that copying is allowed once, it instructs the recording controller 211 to enable recording. In this case, the recording data is recorded on a RAM disc 40 after being scrambled in a particular manner by a scrambler 212. Further, when it is determined that copying is allowed once, the CGMS information and the electronic watermark information are rewritten in the respective rewriting units 206 and 207.

In this embodiment, since the CGMS information is two-bit data in a particular position in the data stream from the decryption unit 202, the CGMS rewriting unit 206 is constructed such that it extracts the two-bit data and rewrites a data state from (10) to (11).

On the other hand, since the electronic watermark information is processed with the spectrum spreading, the electronic watermark information WM rewriting unit 207 is constructed to superimpose a new spread spectrum signal. FIG. 7 shows one example of construction of the electronic watermark information WM rewriting unit 207 in that case. The construction of the unit 207 is the same as the unit of FIG. 3, except for a few points.

More specifically, a synch detector 31, a timing signal generator 32, an SS unit 34, a level adjuster 36, and a WM superimposing unit 38 in FIG. 7 correspond to the synch detector 21, the timing signal generator 22, the SS unit 24, the level adjuster 26, and the WM superimposing unit 27 in FIG. 3, respectively, and are of the same construction.

The first difference from the process for superimposing the electronic watermark information, shown in FIG. 3, is that a switch circuit 37 is disposed between the level adjuster 36 and the WM superimposing unit 38. The switch circuit 37 is controlled to turn on in response to a switching control signal from the control unit 210 only when it is determined that recording is to be executed and hence rewriting is to be executed.

The second difference from the process for superimposing the electronic watermark information, shown in FIG. 3, is the PN code string used in the spectrum spreading. Instead of the PNa generator 23 in FIG. 3, a PNb generator 33 is provided in FIG. 7 and generates a code string PNb different from the code string PNa.

The third difference from the process for superimposing the electronic watermark information, shown in FIG. 3, is that a copy control information generator 35 generates information representing "No More Copy" only unlike the copy control information generator 25 shown in FIG. 3.

Figure 8:
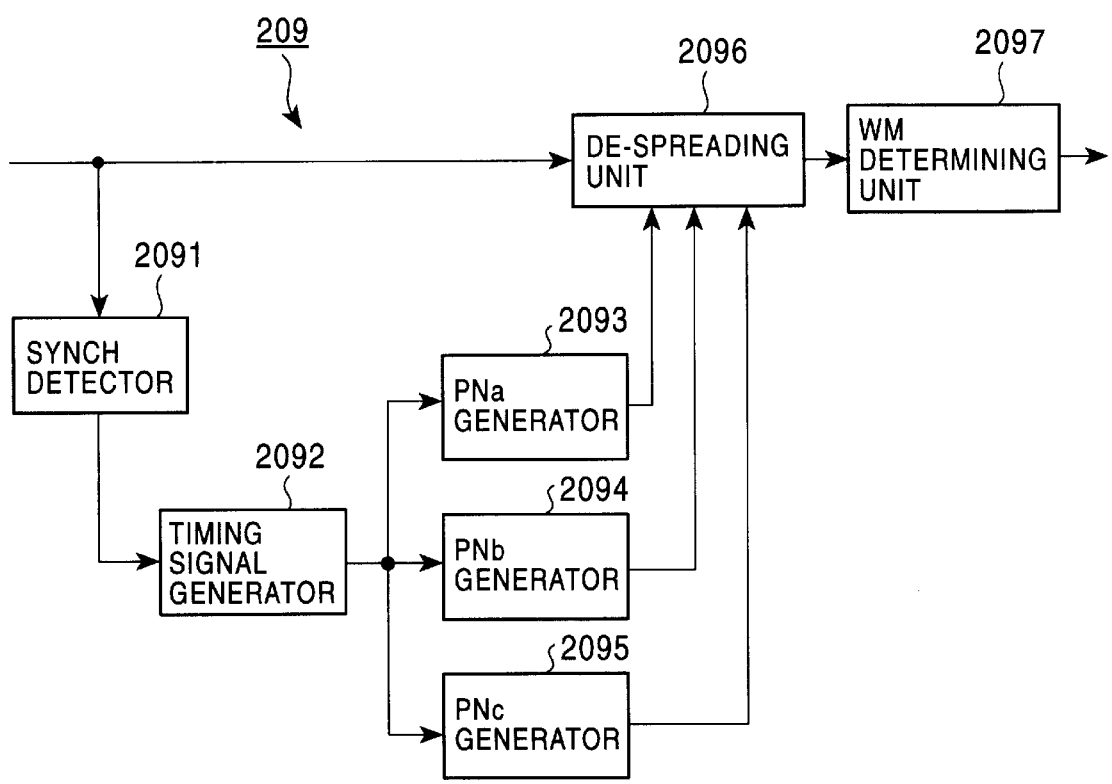
FIG. 8 is a block diagram of the electronic watermark information WM decoder 209 shown in FIG. 6.

FIG. 8 is a block diagram showing one example of construction of the WM decoder 209. The WM decoder 209 comprises a synch detector 2091, a timing signal generator 2092, a PNa generator 2093, a PNb generator 2094, a PNc generator 2095, a de-spreading unit 2096, and a WM determining unit 2097. The WM decoder 209 differs from the WM decoder 17 shown in FIG. 4 in that the PNb generator 2094 and the PNc generator 2095 are additionally provided.

The WM decoder 209 includes the PNb generator 2094 in consideration of the case where a RAM disc prepared by recording made in the recording apparatus 200 is played back by the compliant reproducing apparatus 100, and reproduced signals are inputted to the recording apparatus 200. Also, the WM decoder 209 includes the PNc generator 2095 in consideration of the case where the electronic watermark information may be rewritten to "Never Copy" by the compliant reproducing apparatus 100, as described later in more detail.

The de-spreading unit 2096 of the WM decoder 209 detects one to three pieces of copy control information by de-spreading the electronic watermark information with the three PN codes series PNa, PNb, PNc, and supplies the detected copy control information to the WM determining unit 2097. The WM determining unit 2097 provides an output, the detected copy control information that is closest to prohibition of copy.

A processing flow in the recording apparatus 200 after the decryption will now be described with reference to a flowchart of FIG. 9.

First, in step S101, the CGMS information and the electronic watermark information WM, which are obtained respectively from the CGMS decoder 208 and the WM decoder 209, are checked. In step S102, a determination is made as to whether the determined CGMS information is (11), or whether the determined electronic watermark information WM is "Never Copy" or "No More Copy". If so, the processing goes to step S103 to prohibit recording and cease the recording process. If not so, the processing goes to step S104. Note that the states of (11) and "Never Copy" are never detected for video information applied from the digital input terminal, but they are detected for video information applied from the analog input terminal in some cases.

In step S104, it is determined whether the CGMS information is in the (10) state, or whether the electronic watermark information WM is in the "One Copy" state. If not so, this means that the CGMS information is in the recording allowed state, or that the electronic watermark information WM is in the "Copy Free" state. Therefore, the processing skips to step S107 where recording of the video information is executed as it is.

If the CGMS information is in the (10) state, or if the electronic watermark information WM is in the "One Copy" state, the processing goes to step S105 where processes for rewriting the CGMS information from (10) to (11) and the electronic watermark information WM to "No More Copy" are executed by the CGMS rewriting unit 206 and the WM rewriting unit 207, respectively. In this embodiment, such rewriting of the electronic watermark information is executed by superimposing the electronic watermark information WM that represents "No More Copy", as described above.

Following step S105, the processing goes to step S106 where a scrambling process is performed on the video information, and then to step S107 where recording of the video information on the RAM disc 40 is executed. Incidentally, information indicating that the recorded information is scrambled (hereinafter referred to as a scramble flag) is also recorded, as additive information, on the RAM disc 40.

Relating to Compliant Reproducing Apparatus

Next, one example of construction of the compliant reproducing apparatus 100 will be described with reference to FIGS. 10 to 15.

Figure 10:
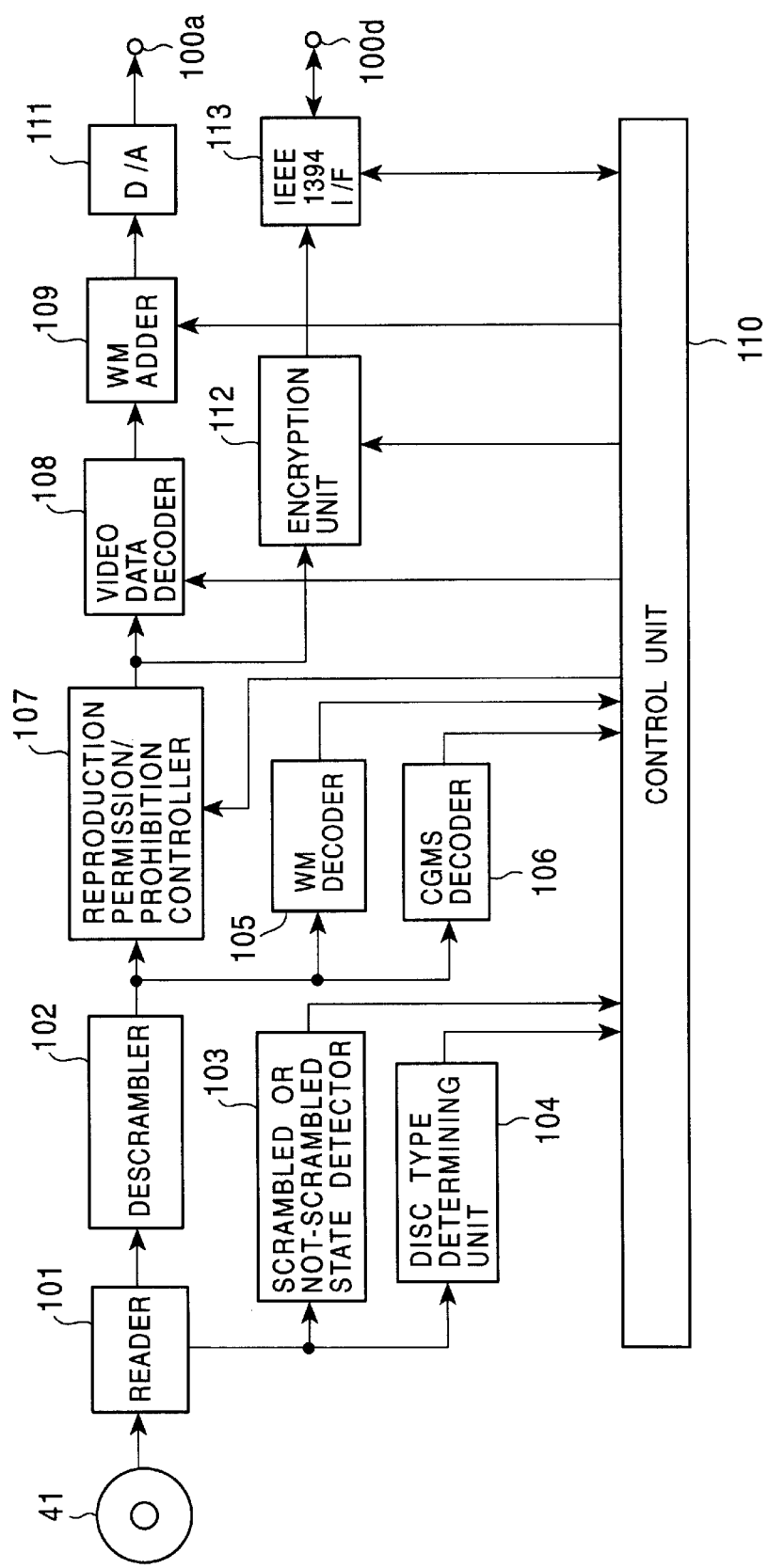
FIG. 10 is a block diagram of one example of a compliant reproducing apparatus used in the first embodiment of the present invention.

FIG. 10 is a block diagram showing an exemplary construction of a compliant reproducing apparatus 100. As shown in FIG. 10, information recorded on a disc 41, which is loaded in the compliant reproducing apparatus 100, is read by a reader 101 and supplied to a descrambler 102, a scrambled or not-scrambled state detector 103, and a disc type determining unit 104.

The scrambled or not-scrambled state detector 103 extracts a scramble flag recorded as additive information on the disc 41, detects whether the recorded information is scrambled, and outputs the detected result to a control unit 110. It is here assumed that a ROM disc on which information is recorded with the CGMS information being in the (11) state or the electronic watermark information WM being in the "Never Copy" state, i.e., a copy-prohibited ROM disc, is scrambled in accordance with the CSS (Contents Scramble System).

The disc type determining unit 104 determines from TOC (Table of Contents) or directory information, for example, whether the loaded disc is a RAM disc or a ROM disc, and supplies the results of the determination to the control unit 110.

The descrambler 102 carries out a process of descrambling the information having been scrambled by the scrambler 212 of the recording apparatus 200. Even for a RAM disc on which recording is made by a noncompliant recording apparatus, the descrambler 102 carries out the descrambling process even though such a RAM disc is not presumably scrambled. Accordingly, for a RAM disc on which recording is made by a noncompliant recording apparatus and which is not scrambled, the RAM disc is inversely scrambled by the descrambling process so that signals reproduced from the RAM disc cannot be normally viewed.

The output data from the descrambler 102 is supplied to a WM decoder 105, a CGMS decoder 106, as well as a reproduction permission/prohibition controller 107.

The WM decoder 105 and the CGMS decoder 106 extract and determine the electronic watermark information WM and the CGMS information, respectively. The extracted information is supplied to the control unit 110.

Based on the extracted CGMS information and electronic watermark information WM, the control unit 110 decides whether reproduction of the recorded information is permitted or prohibited. The resulting control information is supplied to the reproduction permission/prohibition controller 107. If the reproduction is prohibited, the control unit 110 prohibits the processing subsequent to the reproduction permission/prohibition controller 107. Accordingly, analog reproduced signals are not output, and neither are digital signals output via the IEEE 1394 interface.

If the reproduction is permitted, the control unit 110 makes effective the processing subsequent to the reproduction permission/prohibition controller 107. The data from the reproduction permission/prohibition controller 107 is supplied to a video data decoder 108 in which the MPEG-compressed data is decompressed. The decompressed data is supplied to a D/A converter 112 via a WM adder 109 for conversion into analog signals, and then supplied to an external electronic apparatus via an analog output terminal 100a.

The WM adder 109 executes a process of adding the electronic watermark information representing the "Never Copy", described above in connection with FIG. 1, to the reproduced output data. Specifically, if the disc 41 is a RAM disc and the electronic watermark information superimposed on the information read out of the disc 41 is in the "No More Copy" or "One Copy" state, the WM adder 109 adds the electronic watermark information WM representing the "Never Copy" state to the reproduced signals to be output from the analog output terminal 100a.

Figure 11:
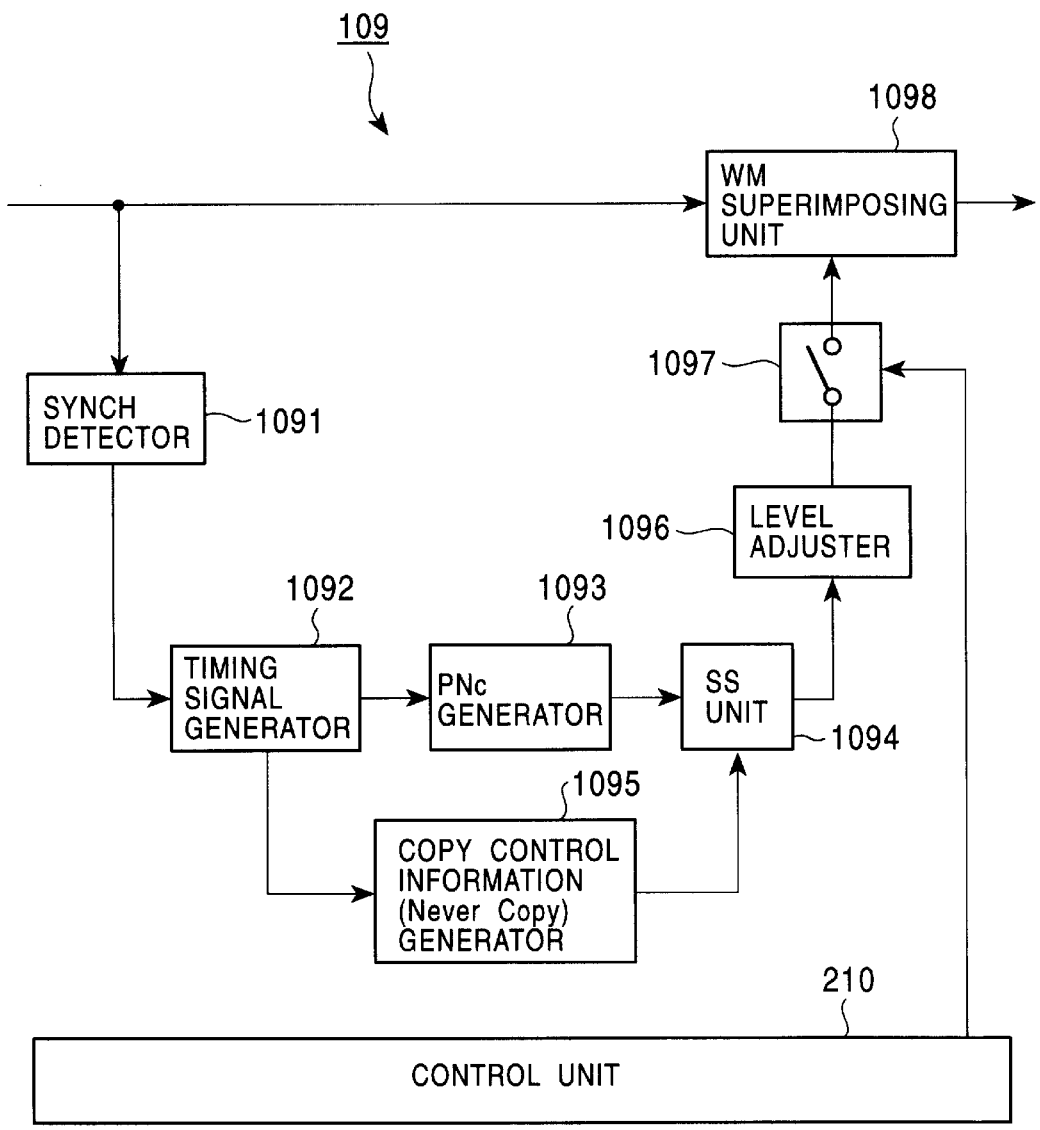
FIG. 11 is a block diagram of the electronic watermark information WM rewriting unit 109 shown in FIG. 10.

FIG. 11 shows one example of the construction of the WM adder 109. The construction of the WM adder 109 is basically similar to that of the electronic watermark information WM rewriting unit 207 shown in FIG. 7. A synch detector 1091, a timing signal generator 1092, an SS unit 1094, a level adjuster 1096, a switch circuit 1097, and a WM superimposing unit 1097 in FIG. 11 correspond to the synch detector 31, the timing signal generator 32, the SS unit 34, the level adjuster 36, the switch circuit 37, and the WM superimposing unit 38 in FIG. 7, respectively. The switch circuit 1097 is turned on by the control unit 110 when the copy control information of "Never Copy" is superimposed, as the electronic watermark information, on the reproduced output signals.

The WM adder 109 in FIG. 11 differs from the WM rewriting unit 207 in FIG. 7 in contents of a copy control signal generated by a copy control information generator 1095 and a PN code string used in spectrum spreading.

More specifically, the copy control information generator 1095 generates only the information of "Never Copy" unlike the copy control information generator 1095 in FIG. 7.

Also, instead of the PNb generator 33 in FIG. 7, a PNc generator 1093 is provided in FIG. 11 to generate a code string PNc different from the code strings PNa, PNb. By using different types of PN code strings, even though plural pieces of copy control information having been subjected to the spectrum spreading are superimposed together on the video information signals, it is possible to separately detect the different states of the copy control information. Further, as mentioned above, when choosing among plural pieces of copy control information, the current copy control information is taken to be the copy control information that is closest to prohibition of copy. Thus, an operating effect equivalent to that obtained with rewriting can be realized.

Note that the WM decoder 105 has exactly the same construction as the WM decoder 209 shown in FIG. 8.

Next, the processing operation of the compliant reproducing apparatus 100 in this embodiment will be described with reference to FIGS. 12 to 15.

In the reproducing apparatus 100, it is first determined in step S201 whether information recorded on a loaded disc is scrambled. The scrambled condition to be determined here includes scrambling by the scrambler 212 of the recording apparatus 200 and scrambling in accordance with the CSS for ROM discs. If scrambled, the processing goes to step S202 to determine whether the disc type is ROM or RAM.

If the loaded disc is a RAM disc, the processing goes to step S203 to check the CGMS information and the electronic watermark information WM. In next step S204, it is determined whether the CGMS information is in the (10) state, or whether the electronic watermark information WM is in the "One Copy" or "Never Copy" state. If so, the processing goes to step S205 to prohibit reproduction.

The reason why reproduction is prohibited when it is determined in step S204 that the CGMS information is (10) or the electronic watermark information WM is "One Copy" is now explained. If the recorded information is scrambled, this means that the loaded disc is a RAM disc on which recording has been made by the compliant recording apparatus 200, as mentioned above. Nevertheless, if the CGMS information is in the (10) (one copy allowed) state, or if the electronic watermark information WM is in the "One Copy", this means that the loaded copy was prepared by illegal copying.

In other words, if the loaded disc is a RAM disc on which recording has been made by the compliant recording apparatus 200, the CGMS information should have been rewritten from (10) to (11) and the electronic watermark information WM should have been rewritten to "No More Copy".

Also, the reason why reproduction is prohibited when it is determined that the loaded disc is a RAM disc and the electronic watermark information WM is in the "Never Copy" state is because such a RAM disc means that the electronic watermark information WM was written to "Never Copy" by the compliant reproducing apparatus 100.

If it is determined in step S204 that the CGMS information is not in the (10) state, or that the electronic watermark information WM is not in the "One Copy" or "Never Copy" state, the processing goes to step S206 to permit reproduction. Thereafter, the processing goes to step S210 to execute IEEE 1394 I/F output control, i.e., digital output control, and reproduction output control (reproduction output control is analog output control in this embodiment).

Further, if it is determined in step S202 that the loaded disc is a ROM disc, the processing goes to step S207 to check the CGMS information and the electronic watermark information WM. In next step S208, it is determined whether the electronic watermark information WM is in the "Never Copy" state. This is a process for confirming that information recorded on the disc is scrambled in accordance with the CSS and that the electronic watermark information WM for a copy-prohibited ROM disc is correctly in the "Never Copy" state.

If it is determined in step S208 that the electronic watermark information WM is not in the "Never Copy" state, the loaded disc is regarded as an illegally produced disc, and the processing goes to step S209 to prohibit reproduction. If the electronic watermark information WM is correctly in the "Never Copy" state, the processing goes to step S206 to permit reproduction. Thereafter, the processing goes to step S210 to execute the digital output control and the reproduction output control.

Figure 13:
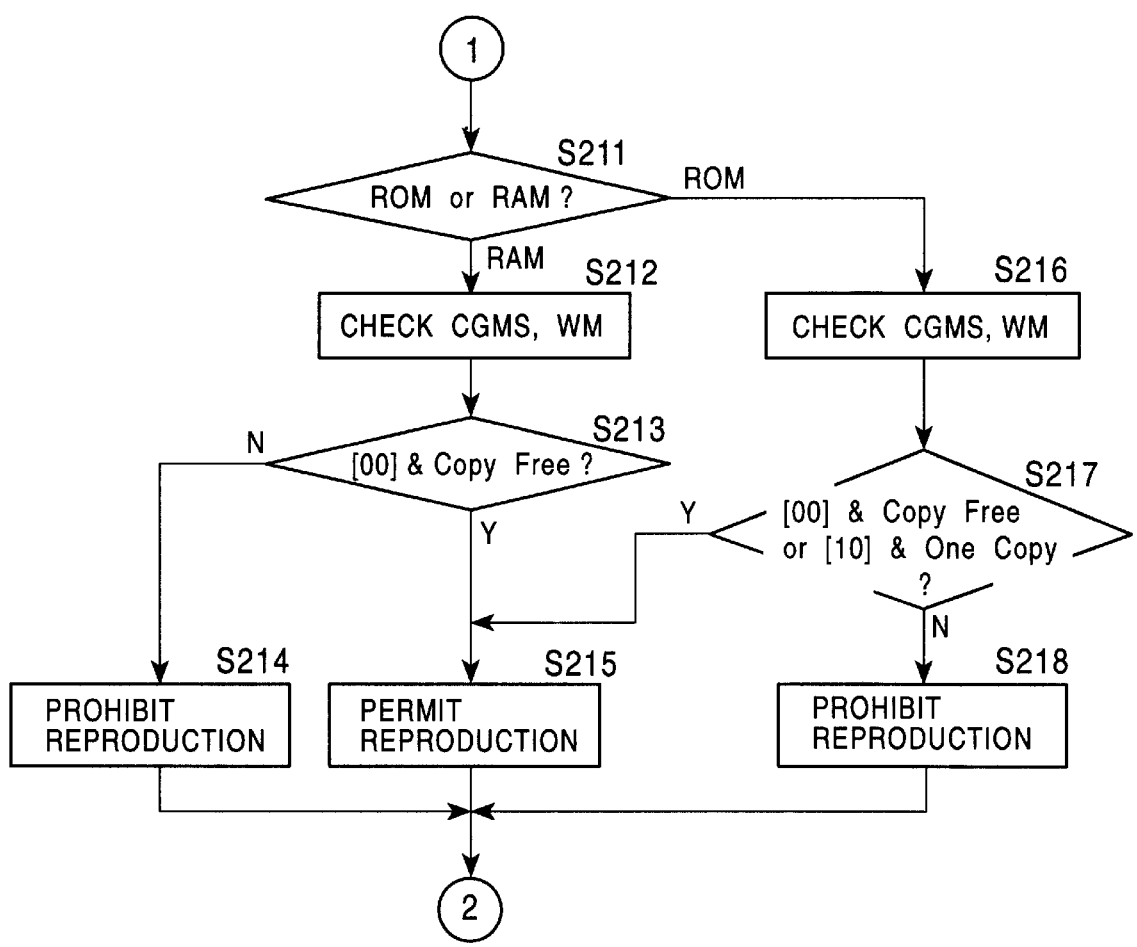
FIG. 13 is a part of a flowchart for explaining the processing operation of the reproducing apparatus shown in FIG. 10.

If it is determined in step S201 that information recorded on a loaded disc is not scrambled, the processing goes to step S211 in FIG. 13 to determine whether the loaded disc is a ROM or RAM disc. If the loaded disc is a RAM disc, the processing goes to step S212 to check the CGMS information and the electronic watermark information WM.

In next step S213, it is determined whether the CGMS information is in the (00) state, or whether the electronic watermark information WM is in the "Copy Free" state. If not so, the loaded disc is regarded as an illegally produced disc, and the processing goes to step S214 to prohibit reproduction. On the other hand, if it is determined in step S213 that the CGMS information is in the (00) state and the electronic watermark information WM is in the "Copy Free" state, the processing goes to step S215 to permit reproduction.

Further, if it is determined in step S211 that the loaded disc is a ROM disc, the processing goes to step S216 to check the CGMS information and the electronic watermark information WM. It is then checked in step S217 whether the CGMS information is (00) and the electronic watermark information WM is "Copy Free", or the CGMS information is (11) and the electronic watermark information WM is "No More Copy", or the CGMS information is (10) and the electronic watermark information WM is "One Copy". If any of these conditions is satisfied, the processing goes to step S215 to permit reproduction, and if not, the processing goes to step S218 to prohibit reproduction.

Stated otherwise, if the loaded disc is a ROM disc and the copy control information is (11) or "Never Copy", that disc should have been scrambled in accordance with the CSS in this embodiment. Therefore, if the copy control information is determined to be (11) or "Never Copy" for a disc which is not scrambled, the loaded disc is determined to be an illegally produced disc, and reproduction is prohibited.

Figure 14:
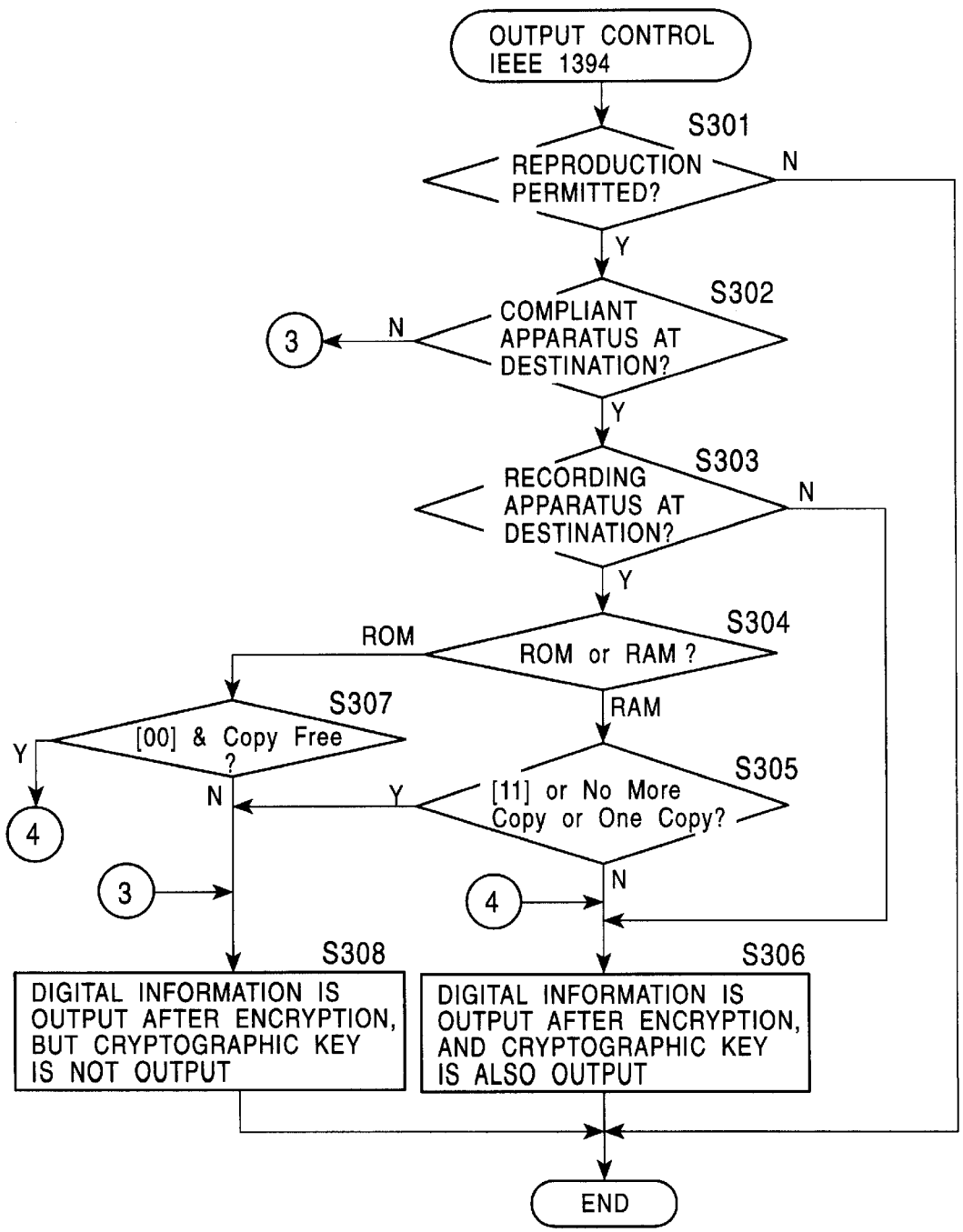
FIG. 14 is a flowchart for explaining digital output control in the reproducing apparatus shown in FIG. 10.

The output control in step S210 will be described below. FIG. 14 is a flowchart for explaining the digital output control, i.e., the IEEE 1394 I/F output control. This control corresponds to the above-described IEEE 1394 secure bus control.

In step S301, it is determined whether reproduction is permitted or prohibited. If prohibited, output control is ended. If permitted, the processing goes to step S302 where the control unit communicates with an apparatus at the destination via the IEEE 1394 bus to determine whether the destination apparatus is a compliant apparatus. If it is determined that the destination apparatus is not a compliant apparatus, the processing goes to step S308 where the digital information (MPEG-compressed data) is output after encryption, but the cryptographic key for decrypting the encrypted information is not outputted to the destination. As a result, any noncompliant apparatus is disabled from decrypting the encrypted data.

If the determination made in step S302 results in that the destination apparatus is a compliant apparatus, the processing goes to step S303 to determine whether the compliant apparatus at the destination is a recording apparatus. If not so, the processing skips to step S306 where the digital information (MPEG-compressed data) is outputted after encryption, and the cryptographic key for decrypting the encrypted information is also outputted to the destination.

If it is determined in step S303 that the destination apparatus is a compliant recording apparatus, the processing goes to step S304 to determine whether the loaded disc is a ROM or RAM disc. If the loaded disc is determined to be a RAM disc, the processing goes to step S305 to determine whether the CGMS information is in the (11) state, or whether the electronic watermark information WM is in the "No More Copy" or "One Copy" state. If those conditions are not satisfied, the processing goes to step S306 where the digital information (MPEG-compressed data) is output after encryption, and the cryptographic key for decrypting the encrypted information is also output to the destination. If any of those conditions is satisfied, the processing goes to step S308 where the digital information (MPEG-compressed data) is outputted after encryption, but the cryptographic key for decrypting the encrypted information is not outputted to the destination.

If it is determined in step S304 that the loaded disc is a ROM disc, the processing goes to step S307 to determine whether the CGMS information is in the (00) state, or whether the electronic watermark information WM is in the "Copy Free" state. If so, the processing goes to step S306 where the digital information (MPEG-compressed data) is output after encryption, and the cryptographic key for decrypting the encrypted information is also output to the destination. If not so, the processing goes to step S308 where the digital information (MPEG-compressed data) is output after encryption, but the cryptographic key for decrypting the encrypted information is not outputted to the destination.

The reproduction output control for analog outputs will be described below with reference to a flowchart shown in FIG. 15.

First, in step S311, it is determined whether reproduction is permitted or prohibited. If prohibited, output control is ended. If permitted, the processing goes to step S312 to determine whether a disc to be played back is a RAM or ROM disc. If the disc is determined to be a ROM disc, this means that reproduction is permitted. Therefore, the processing goes to step S315 where the reproduced output signals are outputted through the terminal 100a.

If it is determined in step S312 that the disc is a RAM disc, the processing goes to step S303 to determine whether the CGMS information is in the (11) state, or whether the electronic watermark information WM is in the "No More Copy" or "One Copy" state. If so, the processing goes to step S314 where the electronic watermark information representing "Never Copy" is superimposed on the reproduced output signals. Thereafter, the processing goes to step S215 where the reproduced output signals including "Never Copy" superimposed thereon are output through the terminal 100a.

If it is determined in step S313 that the CGMS information is not in the (11) state, or that the electronic watermark information WM is not in the "No More Copy" or "One Copy" state, the processing skips to step S315 where the reproduced output signals are output through the terminal 100a as they are.

In the above description, the determination result of the disc type determining unit 104 is referred to in the reproduced output control (see FIG. 15) carried out in the reproducing apparatus 100, taking into account that even a ROM disc may have a condition where the CGMS information is (10) or the electronic watermark information WM is "One Copy". However, the condition of a ROM disc where the CGMS information is (10) or the electronic watermark information WM is "One Copy" means that the disc is allowed to be copied free. For this reason, it is thought that the reproducing apparatus is constructed so as to keep ROM discs from coming into the condition where the CGMS information is (10) or the electronic watermark information WM is "One Copy".

Figure 15:
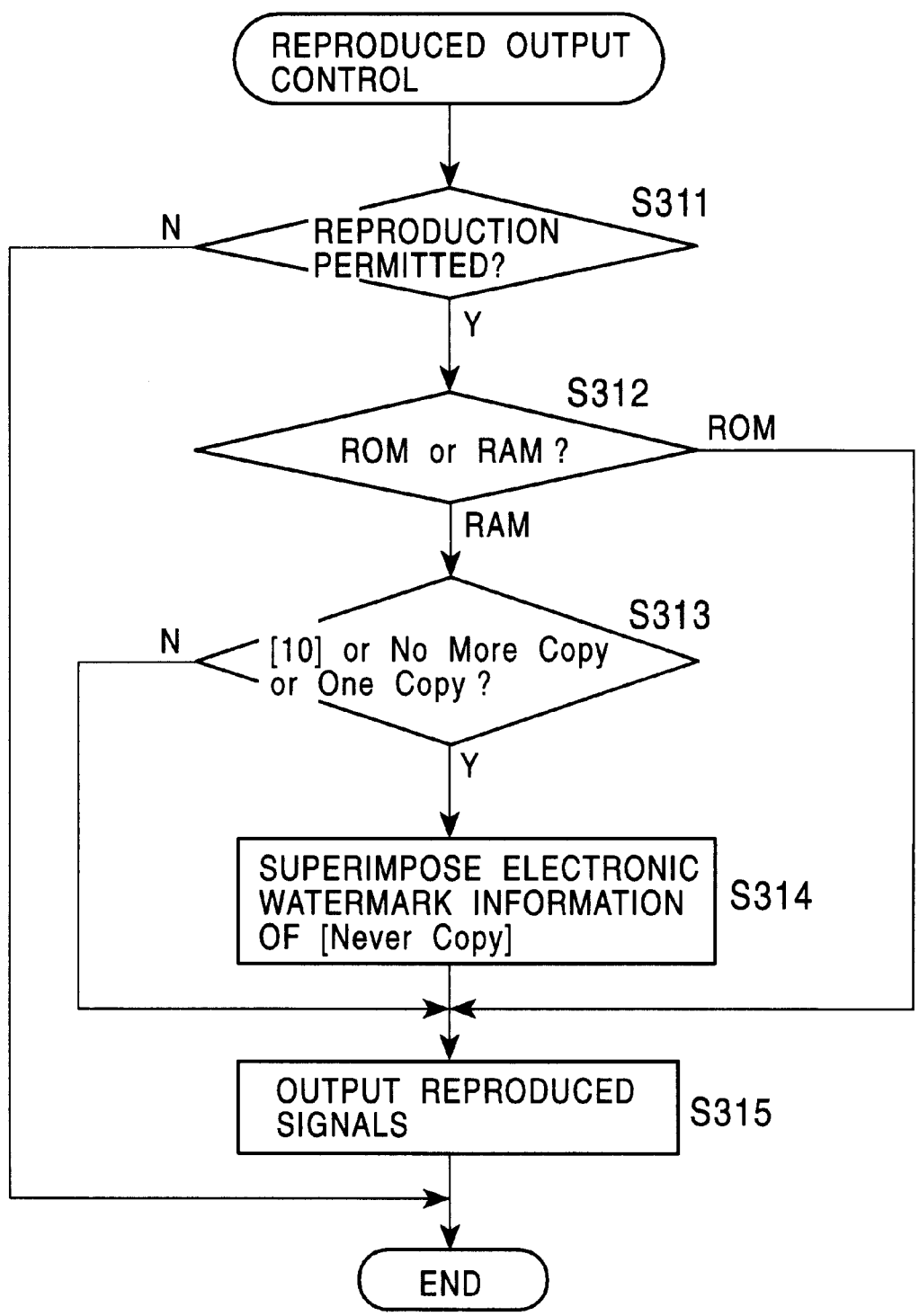
FIG. 15 is a flowchart for explaining reproduction output control in the reproducing apparatus shown in FIG. 10.

In that case, the step S312 in FIG. 15 is no longer needed. Specifically, the flowchart may be modified such that on condition of a disc recording medium being loaded, if the CGMS information is in the (11) state, or if the electronic watermark information WM is in the "No More Copy" or the "One Copy" state, the electronic watermark information WM representing "Never Copy" is superimposed on the reproduced output signals.

Second Embodiment

In the first embodiment described above, when the electronic watermark information WM is "One Copy", the recording apparatus rewrites the electronic watermark information WM to the "No More Copy" state. Thus, the electronic watermark information WM representing the "No More Copy" state is superimposed in addition to the electronic watermark information WM in the "One Copy" state. In the reproducing apparatus, the electronic watermark information WM representing the "Never Copy" is further superimposed in addition to those pieces of the electronic watermark information WM.

In the first embodiment, therefore, three pieces of the electronic watermark information WM may be superimposed together. This accompanies a risk that the superimposed electronic watermark information WM may somewhat affect the video information, and the output picture may deteriorate.

This second embodiment is directed toward condition. As described above, when recording is made on a RAM disc by a compliant apparatus, the electronic watermark information WM is necessarily rewritten to the "No More Copy" state, and there exists no "One Copy" state on a RAM disc.

Thus, on an assumption that the electronic watermark information WM is rewritten from the "One Copy" state to the "No More Copy" state upon recording, the electronic watermark information WM superimposed on information signals recorded on a RAM disc takes the "One Copy" state only when the RAM disc is an illegally copied one. For RAM discs, therefore, when the electronic watermark information WM is in the "One Copy" state, it can be judged that those discs are in a copy prohibited state.

Figure 16:
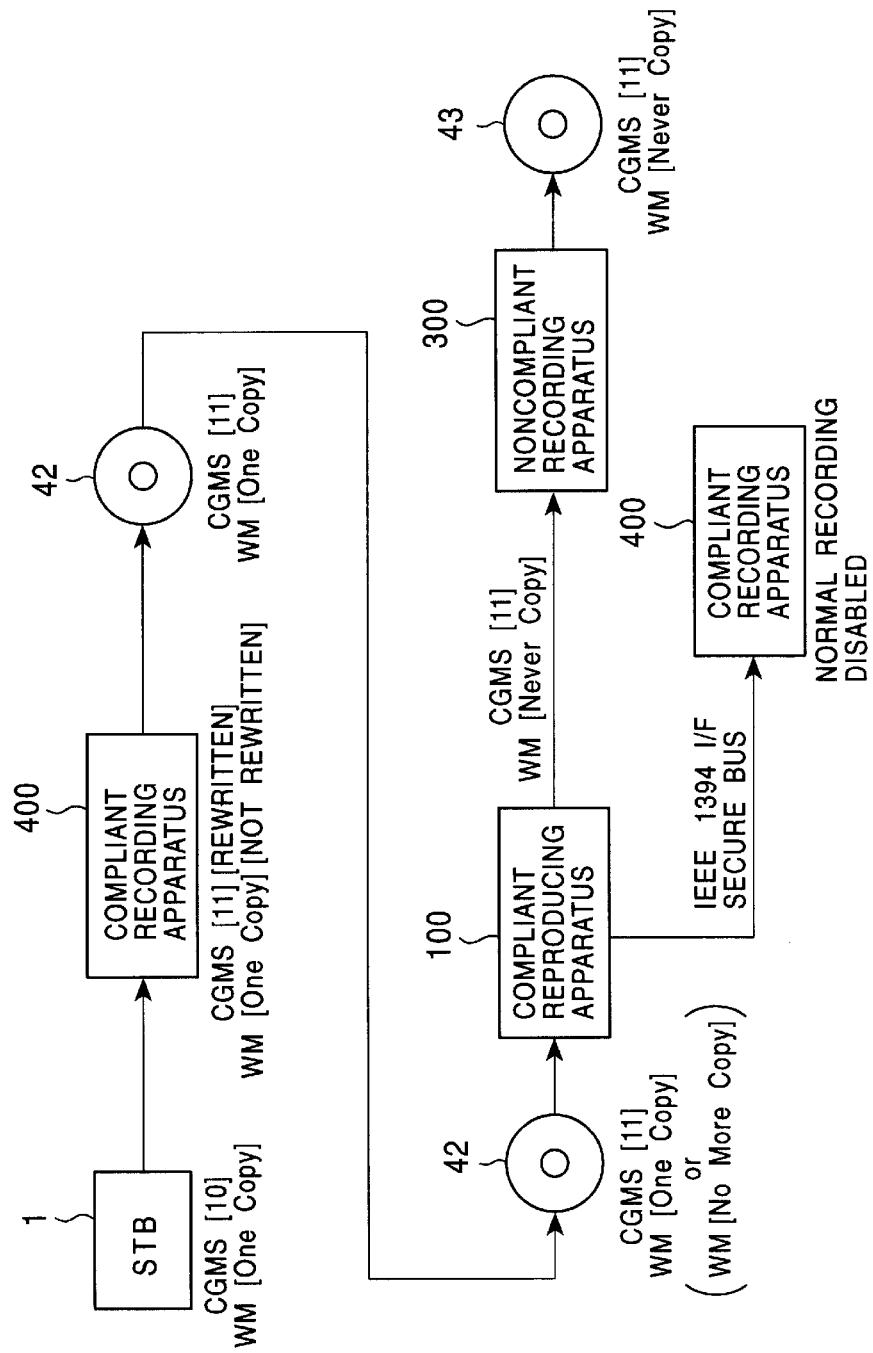
FIG. 16 is a diagram for explaining a second embodiment of a copy generation management method according to the present invention.

Taking into account the above, as shown in FIG. 16, this second embodiment is constructed such that when information signals containing the CGMS information in the (10) state or the electronic watermark information WM in the "One Copy" state is recorded on a RAM disc 42, a compliant recording apparatus 400 rewrites the CGMS information to the (11) state, but does not rewrite the electronic watermark information (WM remains in the "One Copy" state).

In the case of adopting the above rule that the electronic watermark information WM is not rewritten and kept in the "One Copy" state, if the loaded disc is a RAM disc and the electronic watermark information WM is in the "One Copy" state, the electronic watermark information WM superimposed on the information recorded on the RAM disc is recognized to be in the "No More Copy" state. If there exists no possibility, as mentioned above, that ROM discs have the electronic watermark information WM in the "One Copy" state, it is not needed to determine whether the loaded disc is a RAM or ROM disc. Then, if the electronic watermark information WM of any disc recording medium is in the "One Copy" state, this means that the disc recording medium can be recognized to be in the "No More Copy" state.

Nevertheless, the second embodiment will now be described in connection with the case of where ROM discs may have the electronic watermark information WM in the "One Copy" state.

In this second embodiment, the video signals are copied on the RAM disc 42 without rewriting the electronic watermark information. When playing back the copied RAM disc by the compliant reproducing apparatus 100, if it is detected in a like manner to the first embodiment that the electronic watermark information WM of the RAM disc is in the "One Copy" state, this state is recognized as the "No More Copy" state, and the electronic watermark information WM representing the "Never Copy" state is superimposed on the reproduced output signals.

Consequently, as shown in FIG. 16, a similar operating effect as with the first embodiment is realized. Even when the reproduced output signals from the compliant reproducing apparatus 100 are recorded on a RAM disc 43 by a noncompliant recording apparatus 300, the electronic watermark information WM representing the "Never Copy" state is superimposed on the RAM disc 43. Therefore, when the RAM disc 43 is played back again by the compliant reproducing apparatus 100, reproduction of the recorded signals is prohibited. As a result, an effective illegal copy preventing scheme is obtained.

Further, in this second embodiment, since the electronic watermark information is not rewritten by the compliant recording apparatus 400, only two spectrum spread signals are superimposed at maximum. As compared with the first embodiment, therefore, the influence of the electronic watermark information upon the video signals is reduced.

Figure 17:
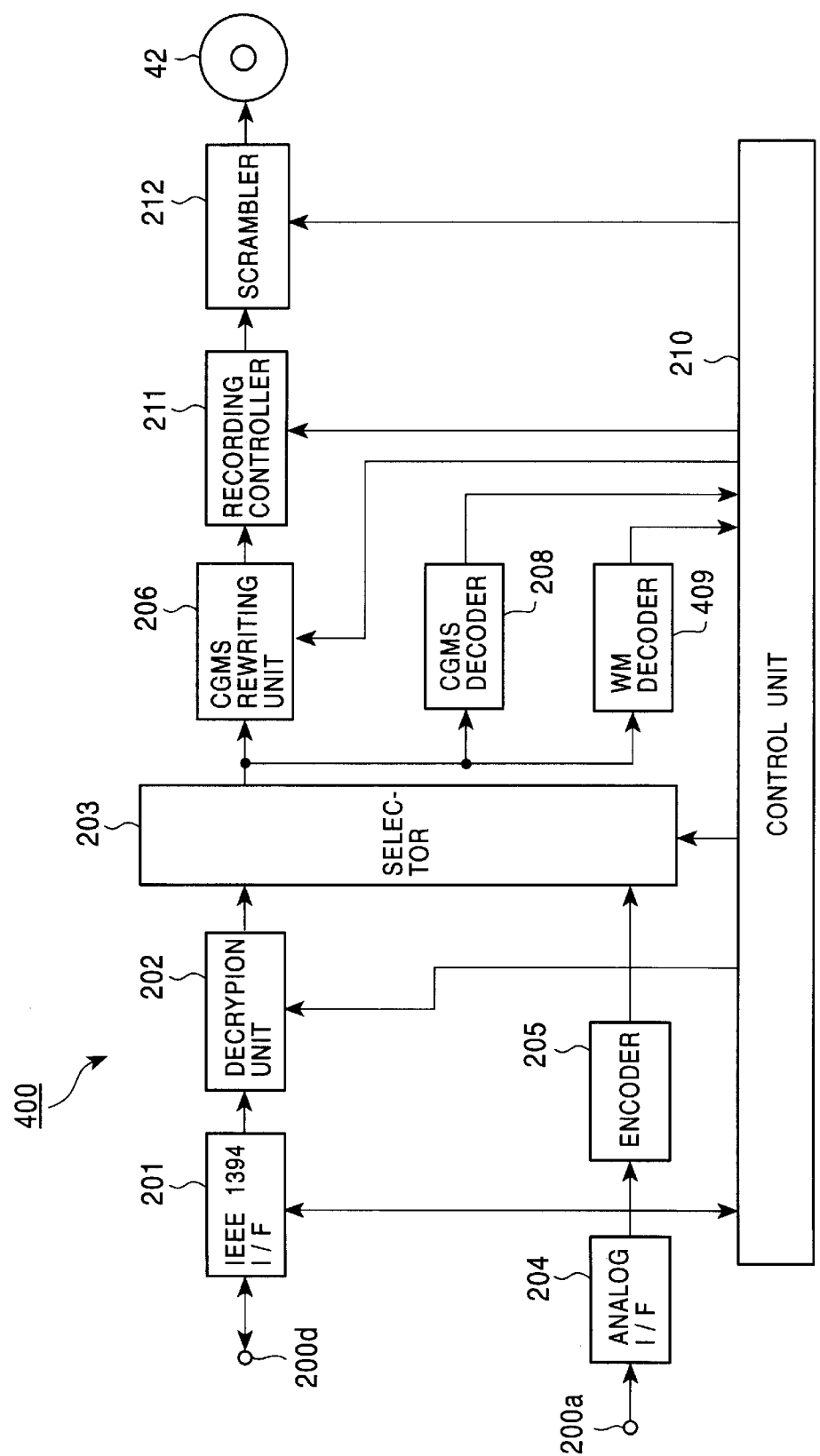
FIG. 17 is a block diagram of one example of a compliant recording apparatus used in the second embodiment of the present invention.

FIG. 17 is a block diagram showing one example of the compliant recording apparatus 400 in the second embodiment. As will be seen from comparing FIG. 17 and FIG. 6 which shows the recording apparatus 200 in the first embodiment, the recording apparatus 400 in the second embodiment does not include the WM rewriting unit 207 of the recording apparatus 400 in the first embodiment.

Figure 18:
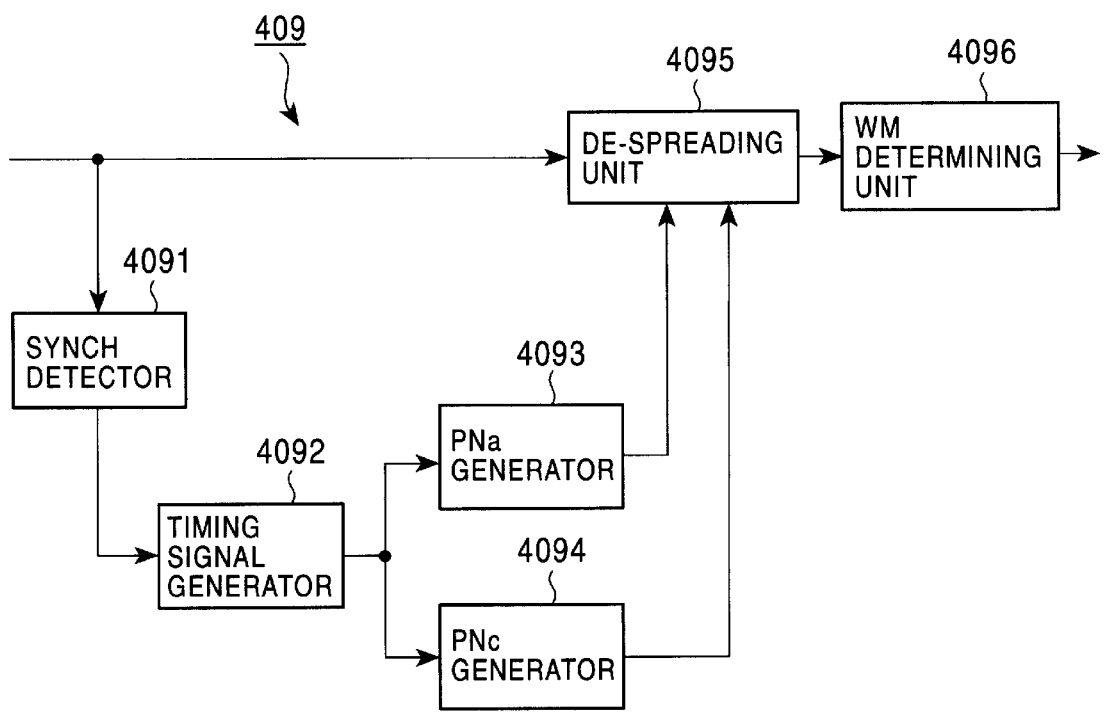
FIG. 18 is a block diagram of a portion of the recording apparatus shown in FIG. 17.

Also, since the step of superimposing the electronic watermark information WM, representing the "No More Copy" state, with the PNb code string is not performed in the second embodiment, a WM decoder 409 of the recording apparatus 400 is constructed as shown in FIG. 18 and requires only two PN code string generators.

More specifically, as shown in FIG. 18, the WM decoder 409 is similar to the WM decoder 209 and comprises a synch detector 4091, a timing signal generator 4092, a PNa generator 4093, a PNc generator 4094, a de-spreading unit 4095, and a WM determining unit 4096.

The PNa generator 4093 detects the electronic watermark information that is superimposed on the signals from the set top box, or the information signals that were recorded on a disc by the recording apparatus 400. Further, the PNc generator 4094 detects the electronic watermark information in the "Never Copy" state that was superimposed by the reproducing apparatus 100.

Figure 9:
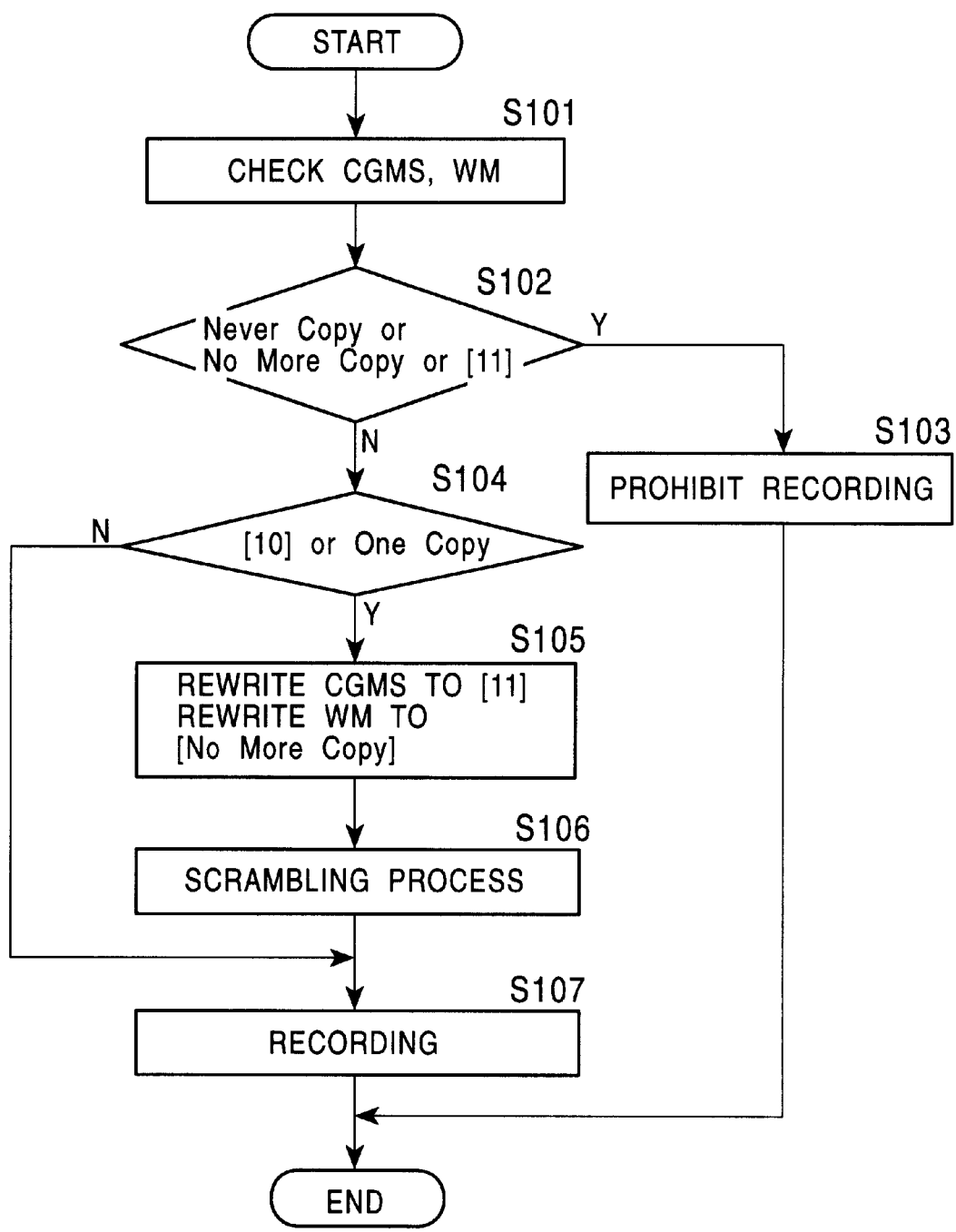
FIG. 9 is a flowchart for explaining the processing operation of the recording apparatus shown in FIG. 6.
Figure 19:
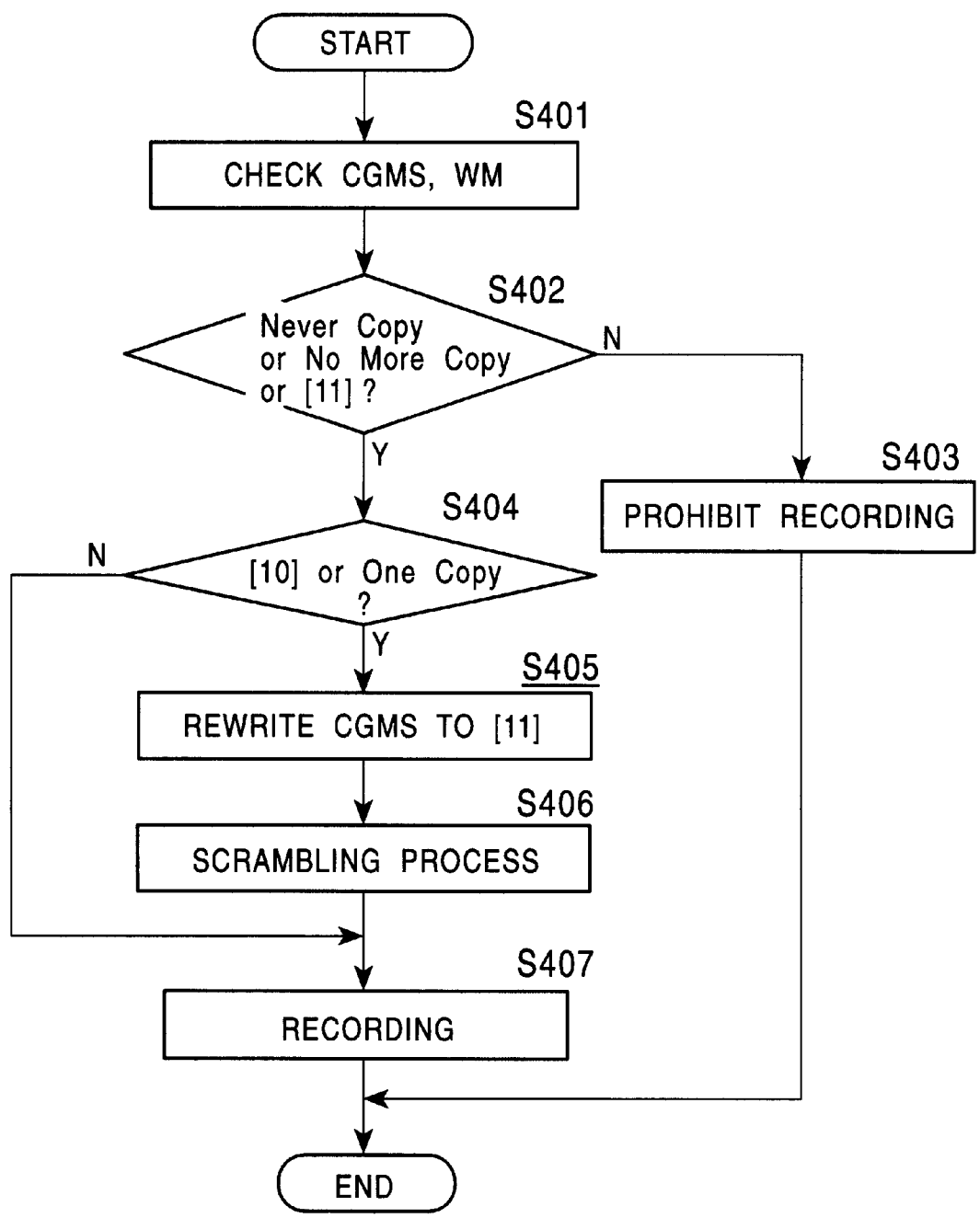
FIG. 19 is a flowchart for explaining the processing operation of the recording apparatus shown in FIG. 17.

FIG. 19 is a flowchart of the processing operation executed in the recording apparatus 400, and corresponds to the flowchart of FIG. 9 for the recording apparatus 200 in the first embodiment. As will be seen from comparing FIGS. 9 and 19, steps S101 to S107 are the same as steps S401 to S407, but step S405 differs from S105. Specifically, while the electronic watermark information WM is rewritten in step S105, only the CGMS information is rewritten and the electronic watermark information WM is not rewritten in step S405.

Figure 12:
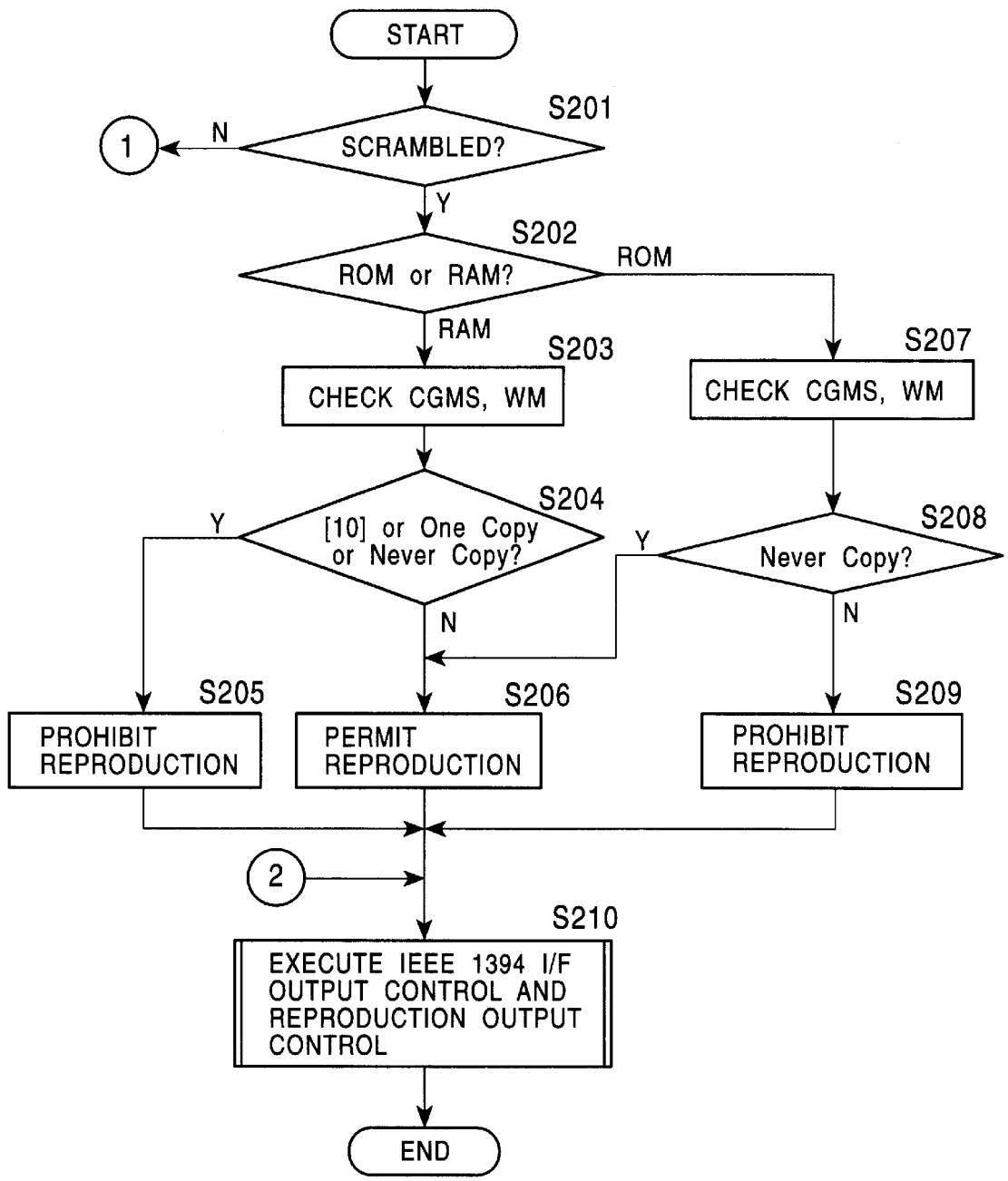
FIG. 12 is a part of a flowchart for explaining the processing operation of the reproducing apparatus shown in FIG. 10.
Figure 20:
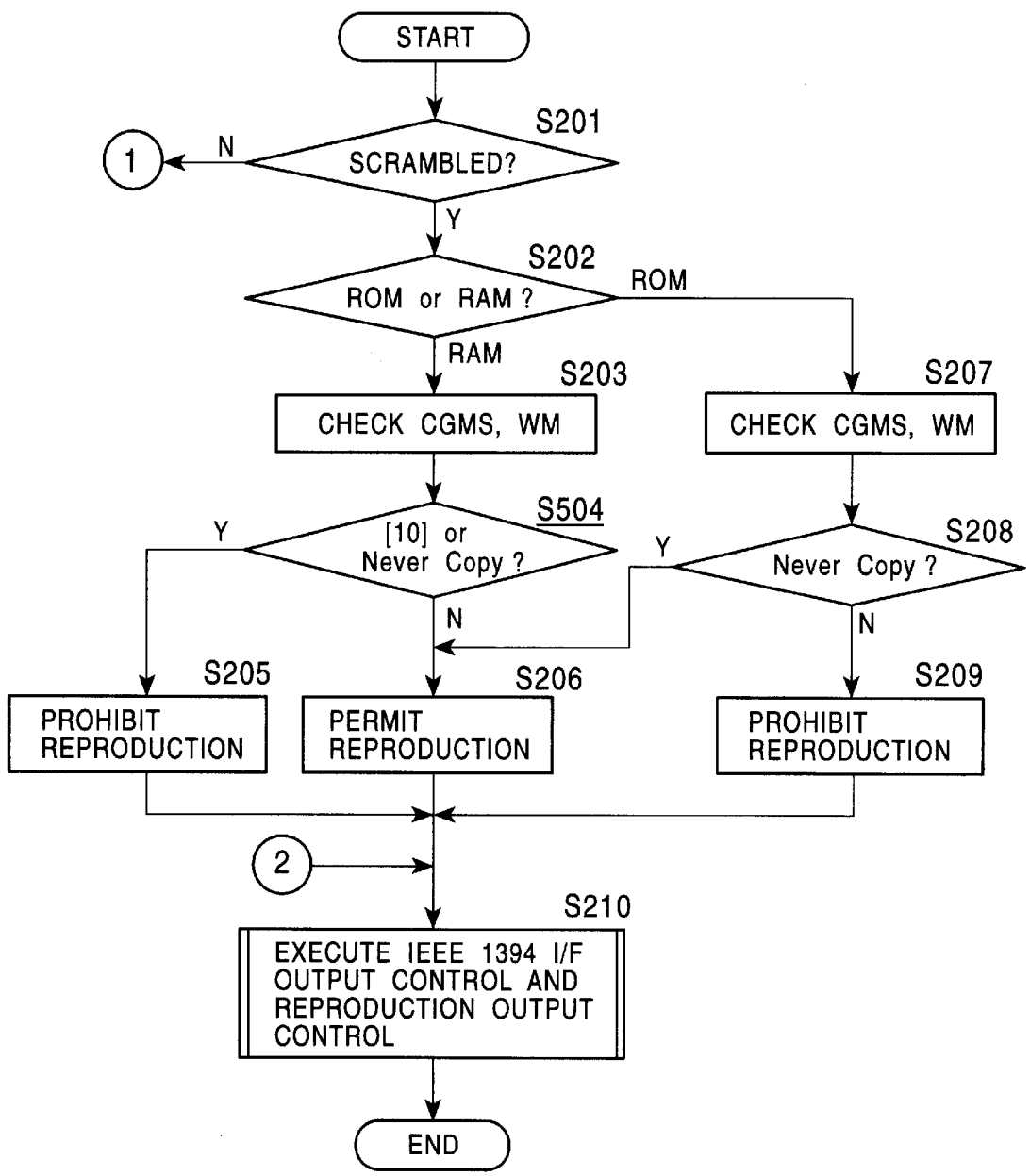
FIG. 20 is a flowchart explaining the processing operation of a compliant reproducing apparatus used in the second embodiment of the present invention.

FIG. 20 is a flowchart of the processing operation executed in the reproducing apparatus 100 in this second embodiment, and corresponds to the flowchart of FIG. 12. Note that a section corresponding to FIG. 13 is exactly the same as FIG. 13, and hence is not shown.

In the flowchart of FIG. 20, the processing in step S504 differs from that in the corresponding step S204 of FIG. 12. In the first embodiment, since the electronic watermark information WM is rewritten by the recording apparatus 200, there exists no possibility that when the recorded information is scrambled, the CGMS information is in the (10) state, and the electronic watermark information WM is in the "One Copy" state. The first embodiment is therefore designed to prohibit reproduction in those cases as well as the case where the electronic watermark information WM is in the "Never Copy" state.

On the other hand, in this second embodiment, the determination in step S504 is not made on the case where the electronic watermark information WM is in the "One Copy" state. In other words, reproduction is permitted even when the electronic watermark information WM is in the "One Copy" state. In the reproduction output control of step S210, however, the electronic watermark information WM representing "Never Copy" is superimposed on the reproduced output signals. The other processing steps are exactly the same as in the first embodiment.

With this second embodiment, since the electronic watermark information WM is not rewritten by the compliant apparatus, the influence of the electronic watermark information upon the reproduced output signals of first generation copy is caused by only the initial electronic watermark information, and deterioration of a reproduced picture can be minimized.

In some cases, the electronic watermark information WM representing "Never Copy" is superimposed on the reproduced output signals. This corresponds to the case where the electronic watermark information is rewritten from the "One Copy" state to the "Never Copy" state. Thus, only two pieces of the electronic watermark information are superimposed on the video information at maximum, and therefore deterioration of a reproduced picture can be lessened as compared with the case of rewriting the electronic watermark information by the recording apparatus.

Modifications

While the above-described compliant recording apparatus does not include a function of determining whether the input information is supplied from a disc or any other unit such as a set top box, the function may also be included in the compliant recording apparatus. By implementing that function in accordance with the IEEE 1394 standards, for example, it is possible to determine whether the input information is supplied from a disc.

In the case of including the above function, on an assumption that ROM discs cannot take a condition where the copy control information superimposed on information signals is in the "One Copy" state, it can be recognized that the information signals were illegally copied. Accordingly, the processing can be modified such that if such a condition is determined, copying and recording are prohibited.

Also, while both CGMS information and electronic watermark information are simultaneously superimposed as the copy control information in the above embodiments, the copy control information to be superimposed may be one of those two types of information. In other words, the present invention is also applicable to the case where, even under copy control in accordance with the CGMS, the electronic watermark information representing "Never Copy" is superimposed on the reproduced output when the CGMS information in the reproduced signals is in the (10) or (11) state. Of course, the present invention is further applicable to the case where copy control is performed using only the electronic watermark information.

The electronic watermark information is not limited to spread spectrum signals used in the above embodiments. For example, the electronic watermark information may be prepared by superimposing additive information at a very low level on digital signals. As an alternative, when data is subjected to compression utilizing orthogonal transformation such as MPEG compression, additive information may be superimposed on a component of the data transformed into the frequency domain at such a very low level that the additive information does not appear as conspicuous noise.

While in the above embodiments the reproduced output signals are in the form of analog signals, the reproduced output signals may be in the form of digital signals. Thus, the present invention is applicable to the case where the electronic watermark information representing "Never Copy" is superimposed on digital signals.

Additionally, a rewritable recording medium is not limited to a disc recording medium, but may be a semiconductor memory. It is a matter of course that information signals are not limited to video signals, but may be, for example, voice signals.

According to the present invention, as described above, when it is determined from copy control information added to an information signal that the information signal is in a more-copy prohibited state, an output signal reproduced from the information signal is outputted after electronic watermark information representing a copy absolutely prohibited state has been superimposed on the reproduced output signal. Therefore, when a recording medium, on which the above information signal has been recorded, is played back by a reproducing apparatus adapted for the copy control processing based on the electronic watermark information, it is possible to prohibit reproduction of the above information signal.

Thus, according to the present invention, effective illegal copy prevention is realized by ensuring that even if information is recorded by illegal copying, reproduction of the recorded information is prohibited.

Further, according to the present invention, when copy control information added to an information signal, that is recorded on a rewritable recording medium, is in a one-copy allowed state, this state is recognized as a more-copy prohibited state. At the time of making copy recording on a recording medium, therefore, the copy control information in the one-copy allowed state is not required to be rewritten to the more-copy prohibited state. Consequently, when the copy control information is superimposed as the electronic watermark information, the number of times of rewriting the electronic watermark information is reduced, whereby the influence of the copy control information upon the information signal is reduced and deterioration of the information signal is minimized.

What is claimed is:

1. A reproducing apparatus, including a system for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the apparatus comprising:

- a reader for reading out the information signal from a recording medium;
- detecting means for detecting said copy control information included in said information signal, said copy control information comprising electronic watermark information embedded in said information signal, and said detecting means being operable to detect said electronic watermark information; and
- adding means for adding further copy control information to said information signal;
- wherein, when said detecting means detects said copy control information to be in the no-more-copy state, said adding means adds electronic watermark copy control information of the never-copy state to said information signal.

2. A reproducing apparatus according to claim 1, further comprising:

- determining means for determining a type of said recording medium; and
- reproducing controller for controlling permission/prohibition of reproducing said information signal read from said recording medium;
- wherein when said determining means determines that said recording medium is writable and said detecting means detects that said copy information is in the state of never-copy, said reproducing controller prohibits reproducing of said information signal.

3. A reproducing apparatus according to claim 1, further comprising scramble detecting means for detecting whether said information signal is scrambled.

4. A reproducing apparatus according to claim 2, wherein said determining means determines whether said recording medium is a RAM disk or a ROM disk.

5. A reproducing apparatus according to claim 1, wherein said detecting means includes watermark detecting means for detecting electrical watermark information that has been added to said information signal.

6. A reproducing apparatus according to claim 1, wherein said detecting means includes CGMS detecting means for detecting CGMS information that has been added to said information signal.

7. A reproducing apparatus according to claim 1, further comprising:

- encryption means for encrypting said information signal and producing an encrypted signal; and
- communication interface means for transmitting said encrypted signal and key information for decrypting said encrypted signal to an apparatus at a destination, said communication interface means being able to obtain, from said apparatus at the destination, information indicating a type of said apparatus at the destination.

8. A reproducing apparatus according to claim 7, wherein said communication interface means does not transmit said key information to said apparatus at the destination when said detecting means detects said copy control information to be in the one-copy state and said apparatus at the destination is a recording apparatus.

9. A reproducing apparatus, including a system for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the apparatus comprising:

- a reader for reading out the information signal from a recording medium;
- determining means for determining a type of said recording medium;
- detecting means for detecting said copy control information included in said information signal, said copy control information comprising electronic watermark information embedded in said information signal, and said detecting means being operable to detect said electronic watermark information; and
- adding means for adding further copy control information to said information signal;
- wherein, when said determining means determines that said recording medium is writable and said detecting means detects that said copy control information is in the no-more-copy state or the one-copy state, said adding means adds electronic watermark copy control information of the never-copy state to said information signal.

10. A reproducing apparatus, including a system for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the apparatus comprising:

- a reader for reading out an information signal from a disk recording medium;
- detecting means for detecting said copy control information included in said information signal, said copy control information comprising electronic watermark information embedded in said information signal, and said detecting means being operable to detect said electronic watermark information; and
- adding means for adding further copy control information to said information signal;
- wherein, when said detecting means detects said copy control information to be in the one-copy state, said adding means adds electronic watermark copy control information of the never-copy state to said information signal.

11. A reproducing method, including a technique for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the method comprising the steps of:

reading out the information signal from a recording medium;

detecting said copy control information included in said information signal, said copy control information comprising electronic watermark information embedded in said information signal, and said step of detecting including detecting said electronic watermark information; and adding further copy control information to said information signal;

wherein, when said detecting indicates that said copy control information is in the no-more-copy state, said adding involves adding electronic watermark copy control information of the never-copy state to said information signal.

12. A reproducing method according to claim 11, further comprising the steps of:

determining a type of said recording medium; and controlling permission/prohibition of reproducing said information signal read from said recording medium;

wherein when said determining indicates that said recording medium is writable and said detecting indicates that said copy information is in the state of never-copy, said controlling involves prohibiting reproducing of said information signal.

13. A reproducing method according to claim 11, further comprising the step of detecting whether said information signal is scrambled.

14. A reproducing method according to claim 12, wherein said determining includes determining whether said recording medium is a RAM disk or a ROM disk.

15. A reproducing method according to claim 11, wherein said detecting includes detecting electrical watermark information that has been added to said information signal.

16. A reproducing method according to claim 11, wherein said detecting includes detecting CGMS information that has been added to said information signal.

17. A reproducing method according to claim 11, further comprising the steps of:

encrypting said information signal and producing an encrypted signal; and transmitting said encrypted signal and key information for decrypting said encrypted signal to an apparatus at a destination, and providing the capability to obtain from said apparatus at the destination information indicating a type of said apparatus at the destination.

18. A reproducing method according to claim 17, wherein said key information is not transmitted to said apparatus at the destination when said detecting indicates that said copy control information is in the one-copy state and said apparatus at the destination is a recording apparatus.

19. A reproducing method, including a technique for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the method comprising the steps of:

reading out the information signal from a recording medium;

determining a type of said recording medium;

detecting said copy control information included in said information signal, said copy control information comprising electronic watermark information embedded in said information signal, and said step of detecting including detecting said electronic watermark information; and adding further copy control information to said information signal;

wherein, when said determining indicates that said recording medium is writable and said detecting indicates that said copy control information is in the no-more-copy state or the one-copy state, said adding involves adding electronic watermark copy control information of the never-copy state to said information signal.

20. A reproducing method, including a technique for controlling copy generation through the use of one or more pieces of copy control information, said copy control information being added to an information signal and being in at least one of three states including a one-copy allowed state (one-copy), a more-copy prohibited state (no-more-copy) which indicates that data has been copied from the data in the one-copy state and further copying thereof is prohibited, and a copy absolutely prohibited state (never-copy), the method comprising the steps of:

reading out an information signal from a disk recording medium;

detecting said copy control information included in said information signal, said copy control information comprising electronic watermark information embedded in said information signal, and said step of detecting including detecting said electronic watermark information; and adding further copy control information to said information signal; wherein, when said detecting indicates that said copy control information is in the one-copy state, said adding involves adding copy electronic watermark control information of the never-copy state to said information signal.

21. A reproducing apparatus, including a system for controlling copy generation through the use of one or more pieces of copy control information, said copy control information being added to an information signal and being in at least one of three states including a one-copy allowed state (one-copy), a more-copy prohibited state (no-more-copy), and a copy absolutely prohibited state (never-copy), the apparatus comprising:

a reader for reading out the information signal from a recording medium;

detecting means for detecting said copy control information included in said information signal;

adding means for adding further copy control information to said information signal;

encryption means for encrypting said information signal and producing an encrypted signal; and communication interface means for transmitting said encrypted signal and key information for decrypting said encrypted signal to an apparatus at a destination, said communication interface means being able to obtain, from said apparatus at the destination, information indicating a type of said apparatus at the destination, wherein said communication interface means does not transmit said key information to said apparatus at the destination when said detecting means detects said copy control information to be in the one-copy state and said apparatus at the destination is a recording apparatus, wherein when said detecting means detects said copy control information to be in the no-more-copy state, said adding means adds copy control information of the never-copy state to said information signal.

22. A reproducing method, including a technique for controlling copy generation through the use of one or more pieces of copy control information, said copy control information being added to an information signal and being in at least one of three states including a one-copy allowed state (one-copy), a more-copy prohibited state (no-more-copy), and a copy absolutely prohibited state (never-copy), the method comprising the steps of:

reading out the information signal from a recording medium;

detecting said copy control information included in said information signal; and adding further copy control information to said information signal;

encrypting said information signal and producing an encrypted signal; and transmitting said encrypted signal and key information for decrypting said encrypted signal to an apparatus at a destination, and providing the capability to obtain from said apparatus at the destination information indicating a type of said apparatus at the destination, wherein said key information is not transmitted to said apparatus at the destination when said detecting indicates that said copy control information is in the one-copy state and said apparatus at the destination is a recording apparatus;

wherein when said detecting indicates that said copy control information is in the no-more-copy state, said adding involves adding copy control information of the never-copy state to said information signal.

* * * * *